US008622686B2

(12) United States Patent  (10) Patent No.: US 8,622,686 B2
Stringfield et al.  (45) Date of Patent: Jan. 7, 2014

(54) STABILIZED DEVICE FOR MOVING A PLURALITY OF CONTAINERS

(75) Inventors: Marvin L. Stringfield, Cambria, WI (US); Cary A. Lindauer, Appleton, WI (US)

(73) Assignee: Arrowhead Systems, Inc., Randolph, WI (US)

( * ) Notice: Subject to any disclaimer, the term of this patent is extended or adjusted under 35 U.S.C. 154(b) by 354 days.

(21) Appl. No.: 12/689,601

(22) Filed: Jan. 19, 2010

(65) Prior Publication Data

US 2010/0183419 A1 Jul. 22, 2010

Related U.S. Application Data

(60) Provisional application No. 61/146,208, filed on Jan. 21, 2009.

(51) Int. Cl.
  *B65G 59/00* (2006.01)
(52) U.S. Cl.
  CPC .......... *B65G 59/005* (2013.01); *Y10S 414/108* (2013.01); *Y10S 414/13* (2013.01)
  USPC ...................... 414/796.8; 414/917; 414/794.3; 414/792.5; 294/86.4; 198/431; 414/929
(58) Field of Classification Search
  USPC .......... 198/418.6, 468.1, 736; 294/86.4, 87.1, 294/902, 99.1; 414/623, 791.6, 791.7, 414/792.7, 792.8, 792.9, 794.4, 796.5, 414/796.8, 796.9, 799, 910, 911, 917; 901/39; 74/103, 105
  See application file for complete search history.

(56) References Cited

U.S. PATENT DOCUMENTS

| | | | | |
|---|---|---|---|---|
| 1,439,556 A | * | 12/1922 | Kirsch | 83/625 |
| 2,230,802 A | * | 2/1941 | Klein | 83/458 |
| 2,549,062 A | | 4/1951 | Davis | |
| 3,507,404 A | * | 4/1970 | Pompe | 414/796.2 |
| 3,517,831 A | | 6/1970 | Hahn | |
| 3,587,875 A | | 6/1971 | Carmody | |
| 3,745,868 A | * | 7/1973 | Prentice | 83/630 |
| 3,837,140 A | * | 9/1974 | Golantsev et al. | 53/540 |
| 3,934,713 A | | 1/1976 | Van der Meer et al. | |
| 3,948,134 A | * | 4/1976 | Mori | 83/625 |
| 4,187,751 A | * | 2/1980 | Barnacle | 83/458 |
| 4,316,693 A | | 2/1982 | Baxter et al. | |
| 4,316,694 A | | 2/1982 | Martin | |
| 4,492,599 A | | 1/1985 | Levitt et al. | |
| 4,493,599 A | | 1/1985 | Hartness et al. | |
| 4,600,095 A | * | 7/1986 | Brems et al. | 198/346.2 |

(Continued)

FOREIGN PATENT DOCUMENTS

| | | | | |
|---|---|---|---|---|
| DE | 1264336 B | * | 3/1968 | |
| DE | 4109209 A | * | 7/1992 | |

*Primary Examiner* — Gregory Adams
(74) *Attorney, Agent, or Firm* — Boyle Fredrickson, S.C.

(57) ABSTRACT

A device for moving containers or other objects relative to a surface such as a pallet includes a frame and a pin matrix movably attached to the frame. The pin matrix includes an array of pins and is housed in a plate having apertures for receiving the pins. The device further includes a pair of tracks that movably support the pin matrix. A method for moving containers or other objects relative to a surface includes the steps of moving the pin matrix over the objects, lowering the pin matrix, securing the objects within the pin matrix, moving the pin matrix and the objects relative to the surface, and raising the pin matrix.

20 Claims, 24 Drawing Sheets

(56) References Cited

U.S. PATENT DOCUMENTS

| | | | |
|---|---|---|---|
| 4,902,188 A * | 2/1990 | Page | 414/495 |
| 5,116,094 A * | 5/1992 | Jones | 294/81.61 |
| 5,387,072 A * | 2/1995 | Gepfert et al. | 414/794.3 |
| 5,425,402 A | 6/1995 | Pringle | |
| 5,439,091 A * | 8/1995 | Mason | 198/346.2 |
| 5,628,539 A * | 5/1997 | Muchalov et al. | 294/86.4 |
| 5,636,966 A | 6/1997 | Lyon et al. | |
| 5,688,013 A * | 11/1997 | Sehrt | 294/99.1 |
| 5,727,365 A * | 3/1998 | Lashyro et al. | 53/448 |
| 6,152,681 A | 11/2000 | Vincent et al. | |
| 6,196,788 B1 | 3/2001 | Talbot et al. | |
| 6,264,421 B1 | 7/2001 | Burkert | |
| 6,318,955 B1 | 11/2001 | Ouellette | |
| 6,328,153 B1 * | 12/2001 | Manghi et al. | 198/736 |
| 6,379,106 B1 | 4/2002 | Baldi | |
| 6,431,817 B1 | 8/2002 | Simkowski | |
| 6,589,008 B1 | 7/2003 | Ingraham | |
| 6,688,839 B1 | 2/2004 | Hirschek et al. | |
| 6,799,497 B1 * | 10/2004 | Creighton et al. | 83/643 |
| 6,884,018 B1 * | 4/2005 | Dugan et al. | 414/462 |
| 2008/0213080 A1 * | 9/2008 | Cachelin et al. | 414/791.6 |
| 2008/0232946 A1 * | 9/2008 | Vranish | 414/787 |
| 2008/0260512 A1 * | 10/2008 | Weller | 414/790.2 |
| 2008/0260513 A1 * | 10/2008 | Lalesse et al. | 414/791.8 |

* cited by examiner

STABILIZED DEVICE FOR MOVING A PLURALITY OF CONTAINERS

CROSS-REFERENCE TO RELATED APPLICATIONS

This application claims priority to U.S. provisional application Ser. No. 61/146,208, filed on Jan. 21, 2009, the entire contents of which are expressly incorporated herein.

BACKGROUND OF THE INVENTION

1. Field of the Invention

The present invention relates in general to the field of palletizers and depalletizers. More particularly, the present invention relates to a palletizer or depalletizer for moving containers of various shapes, e.g., bottles, to or from a pallet.

2. Discussion of the Related Art

Containers, e.g., bottles, are typically shipped and stored using pallets. At some point, the containers must be moved onto or removed from the pallet. In order to do so, the pallet is typically positioned near the end of a conveyor belt. In a depalletizing application, the containers are pushed off of the pallet and onto the conveyor belt as a group. In a palletizing application, the containers are pushed onto the pallet from the conveyor belt.

However, these types of systems can have undesirable consequences. For example, some of the containers may be tipped over during the process, particularly if the containers are top heavy or unstable, e.g., containers that are reverse tapered and thus have a higher center of gravity or a relatively small foot area compared to the upper portions of the container. Additionally, some containers, e.g., those near the edges of the group, may shift position and fall off of the pallet or the conveyor belt during movement. Still further, the conventional manner of moving containers onto or off pallets will likely cause individual containers to knock into one another, which may damage and/or destroy the containers.

What is needed is a container moving system for efficiently moving containers relative to pallets that maintains the containers in an upright orientation and that reduces the potential for damaging, tipping and/or losing containers during movement.

SUMMARY AND OBJECTS OF THE INVENTION

By way of summary, the present invention is directed to a palletizer or depalletizer that includes a pin matrix. A primary object of the invention is to provide a palletizer or depalletizer that can move containers, e.g., bottles, relative to a pallet while maintaining the containers upright and preventing damage to the containers. Another object of the present invention is to provide a palletizer or depalletizer that may be used with containers having a variety of shapes and sizes, so that the palletizer or depalletizer does not have to be recalibrated for each different configuration of container. A further object of the invention is to provide a palletizer or depalletizer wherein the pin matrix may be selectively used depending on the type of container to be moved. Another object of the invention is to provide an apparatus that is ruggedized and reliable, thereby decreasing down time and operating costs. Another object of the invention is to provide an apparatus that has one or more of the characteristics discussed above but which is relatively simple to manufacture and assemble using a minimum of equipment.

In accordance with a first aspect of the invention, these objects are achieved by providing a palletizer or depalletizer having a frame and a movable pin matrix supported by the frame. The pin matrix may have any number of pins and a plate having an array of apertures, each aperture being adapted to receive a respective one of the number of pins. The palletizer or depalletizer may further include a pair of tracks that straddle a conveyor belt and extend beyond an end of the conveyor belt, wherein the pin matrix assembly is movably connected to the tracks.

In accordance with another aspect of the invention, a palletizer or depalletizer is in the form of a frame having two substantially parallel tracks that are spaced apart from one another. The palletizer or depalletizer further includes a pin matrix assembly movably supported by the tracks, wherein the pin matrix assembly includes a plate having a number of apertures and a corresponding number of pins forming a pin matrix that is received by the apertures. The palletizer or depalletizer may further include a lift assembly for raising and lowering the plate.

In accordance with yet another aspect of the invention, a method for unloading containers from a pallet, or loading containers onto a pallet, is accomplished using a pin matrix. The method includes the steps of moving the pin matrix relative to the pallet, lowering the pin matrix, securing the containers within the pin matrix, moving the pin matrix and the containers to a desired location, and raising the pin matrix.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
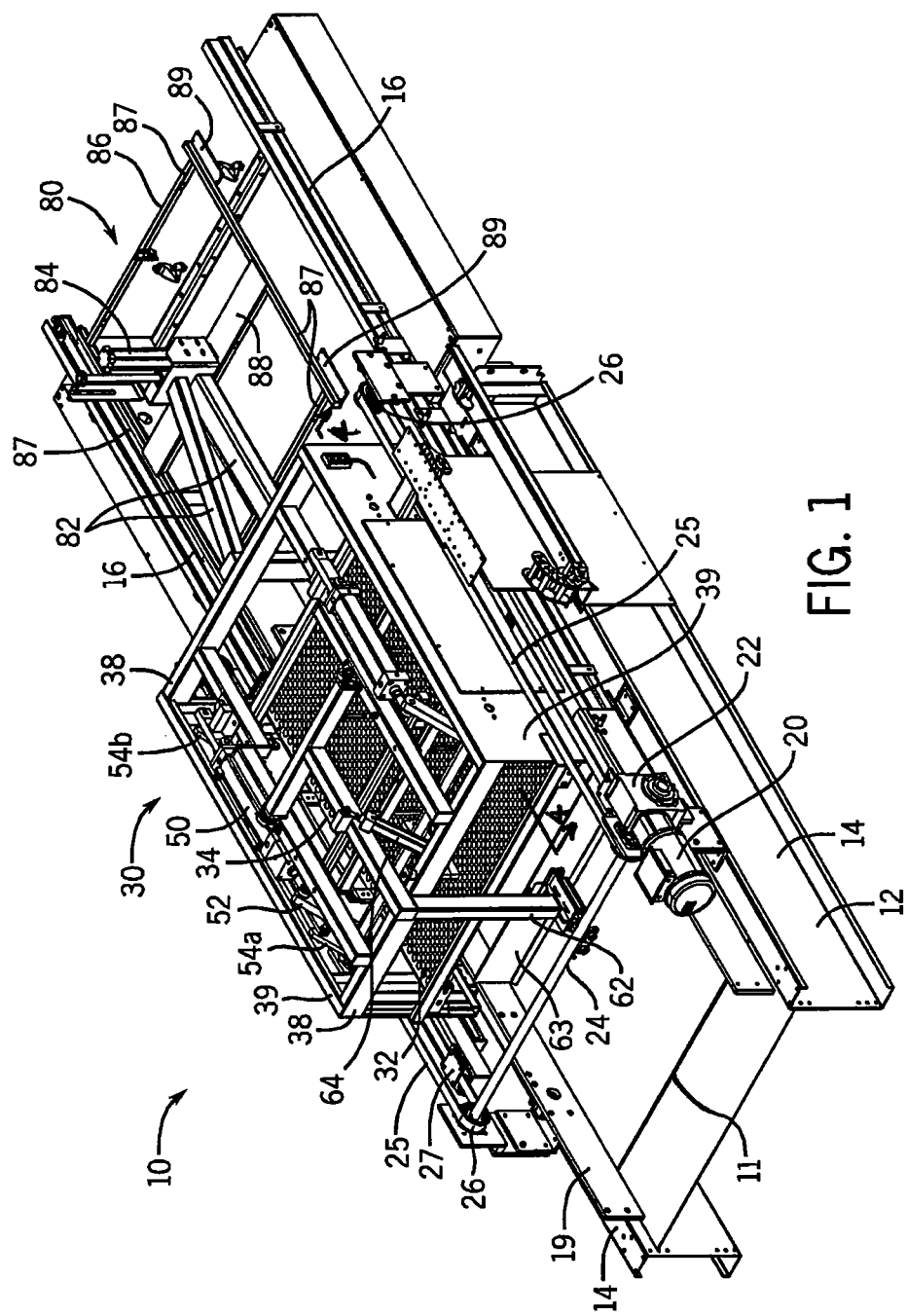
FIG. 1 illustrates an isometric view of a device, in the form of a depalletizer, in accordance with the present invention.

In describing the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected, attached, or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. System Overture

Generally speaking, the present invention relates to a device for moving a plurality of containers while maintaining the containers in an upright orientation. The device may be used in a palletizing application for moving containers onto a pallet, or in a depalletizing application for moving containers off a pallet. The drawings and the following description illustrate the device of the present invention used in a depalletizing application for moving products off a pallet and onto a conveyor belt. It is understood, however, that the device of the present invention may also be used in a palletizing application to move or sweep the containers onto a pallet. It is also understood that the device of the present invention is not necessarily limited to moving containers onto or off of a pallet, and instead may be used in any application in which it is desired to move a group of articles from one location to another while maintaining the articles in an upright position.

Further, the present invention may be used to load or unload a pallet regardless of the positioning of the containers with respect to the pallet, e.g., the containers may be organized in rows or they may be randomly positioned on the surface of the pallet. Thus, the containers do not need to be pre-arranged into a certain position or pattern in order to be loaded or unloaded by the depalletizer/palletizer of the present invention.

In the example of the invention that will be shown and described, the depalletizer of the present invention comprises a frame and a pin matrix assembly that is supported by the frame. The frame enables the pin matrix assembly to be moved over a pallet of containers so that the containers can be secured by the pin matrix and removed from the pallet and onto the conveyor belt. The depalletizer may further include an arm assembly for further securing the containers within the pin matrix assembly and a pallet removal assembly for discarding the pallet after the containers have been removed. The depalletizer may be manually operated, or it may be electronically controlled from a remote location. Alternatively, the depalletizer may be automated using a computer and/or computer network.

2. Detailed Description of Illustrated Embodiments

A depalletizer 10 in accordance with the present invention generally comprises a frame 12 and a pin matrix assembly 30 that is supported by the frame 12. See, e.g., FIG. 1. In the illustrated embodiment, the pin matrix assembly 30 includes a pin matrix 32, and is movably attached to the frame 12 so that the pin matrix assembly 30 can move laterally with respect to the frame 12. For example, once the pin matrix 32 has engaged the containers (which are still on the pallet), the pin matrix assembly 30 is moved laterally, e.g., horizontally, with respect to the frame to slide the containers off of the pallet and onto a conveyor belt 11. See FIGS. 18-21. The lateral motion of the pin matrix assembly 30 with respect to the frame 12 may also be along the same direction as the motion of the conveyor belt 11.

Figure 2:
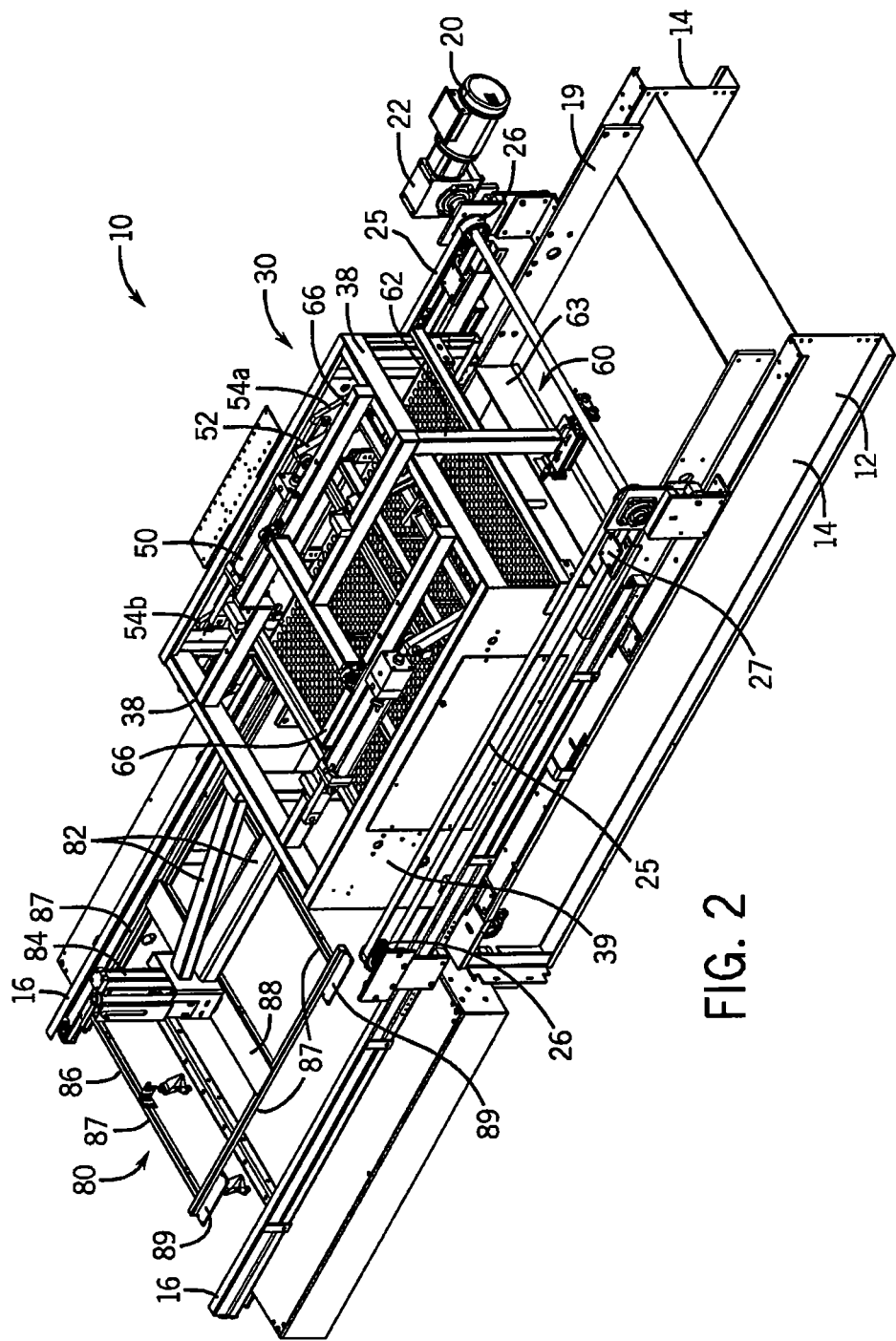
FIG. 2 illustrates another isometric view of the depalletizer of FIG. 1.

As shown in FIGS. 1 and 2, the frame 12 preferably has two spaced-apart frame supports 14 that are substantially parallel to one another. The frame supports 14 are positioned on either side of the conveyor belt 11 that receives the containers that are removed from the pallet by the depalletizer 10. The frame supports 14 may also house all or a portion of the conveyor belt 11. The size and shape of the frame supports 14 may vary, and in the illustrated embodiment the frame supports 14 are C-shaped channel members. This configuration provides a frame support 14 having an upper surface that is substantially horizontal, which makes it relatively easy to attach other components of the depalletizer 10.

The frame 12 further includes two spaced-apart tracks 16 that support and guide the pin matrix assembly 30. The tracks 16 are supported by the frame supports 14 and extend along side a portion of the conveyor belt 11 and beyond the end of the conveyor belt 11. In operation, a pallet is situated near the end of the conveyor belt 11 and between the tracks 16. Preferably, the pallet is raised up from below using an elevator (not shown). The pin matrix assembly 30 then slides over the pallet, secures the containers in the pin matrix 32, and slides the containers off of the pallet and onto the conveyor belt 11.

Figure 16:
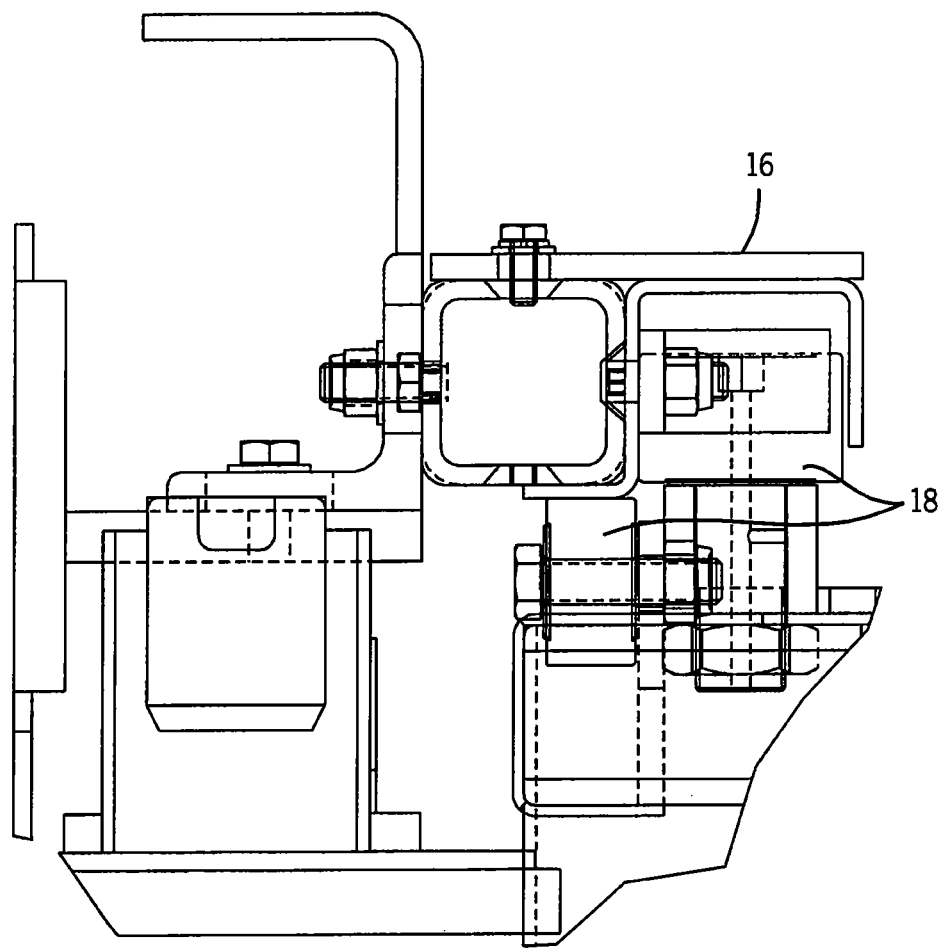
FIG. 16 is an enlarged view of the interconnection of the track and the pin matrix assembly of the depalletizer of FIG. 1 taken along line 16-16 of FIG. 10.

Each track 16 has a groove for receiving one or more bearings 18 that are operably connected to the pin matrix assembly 30. See, e.g., FIG. 16. Accordingly, the pin matrix assembly 30 can slide smoothly along the track. As shown in FIG. 16, one of the bearings 18 has its rotational axis substantially horizontal (i.e., the bearing 18 that is positioned within the C-channel of the track 16) and the other bearing has its rotational axis substantially vertical (i.e., the bearing 18 that is adjacent the track 16 and below the horizontally oriented bearing 18).

The frame 12 also has guides 19 that extend along either side of the conveyor belt 11 and that are substantially parallel to tracks 16. The guides 19 help to guide the containers as they are swept from the pallet to the conveyor belt 11. The guides 19 further prevent containers from tipping over as the pin matrix 32 is lowered over the containers to secure them within the pin matrix 32.

The depalletizer 10 further includes an actuator 20 for moving the pin matrix assembly 30 along the tracks 16. The actuator 20 is operably coupled with the pin matrix assembly 30 to move it along the tracks 16 as desired. The actuator 20 may be any device suitable for moving the pin matrix assembly 30. In the illustrated embodiment, the actuator 20 is a motor that is coupled with a reducer 22 to provide the desirable actuation for moving the pin matrix assembly 30.

Figure 12:
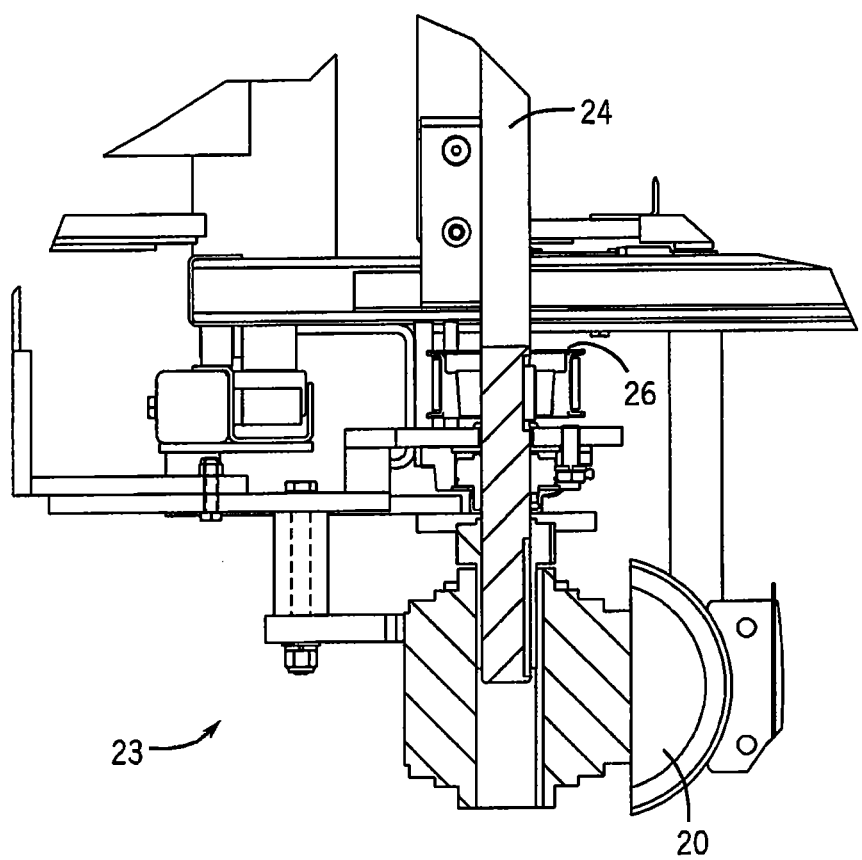
FIG. 12 is an enlarged view of the drive assembly of the depalletizer of FIG. 1 taken along line 12-12 of FIG. 10.
Figure 13:
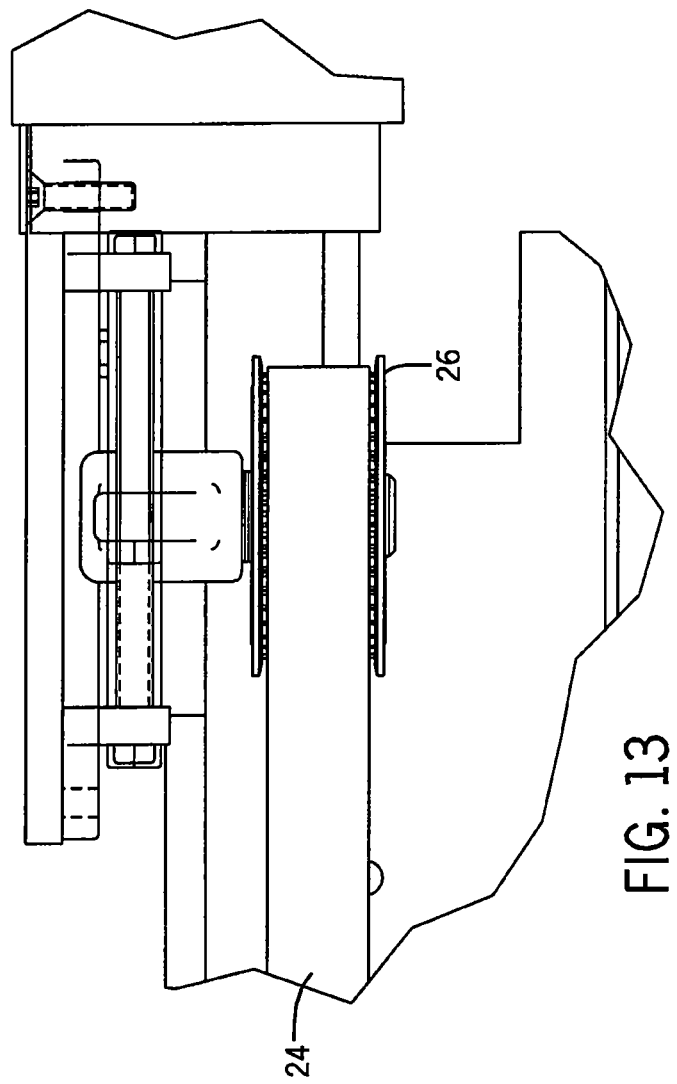
FIG. 13 is an enlarged view of a pulley and belt of the depalletizer of FIG. 1 taken along line 13-13 of FIG. 3.
Figure 14:
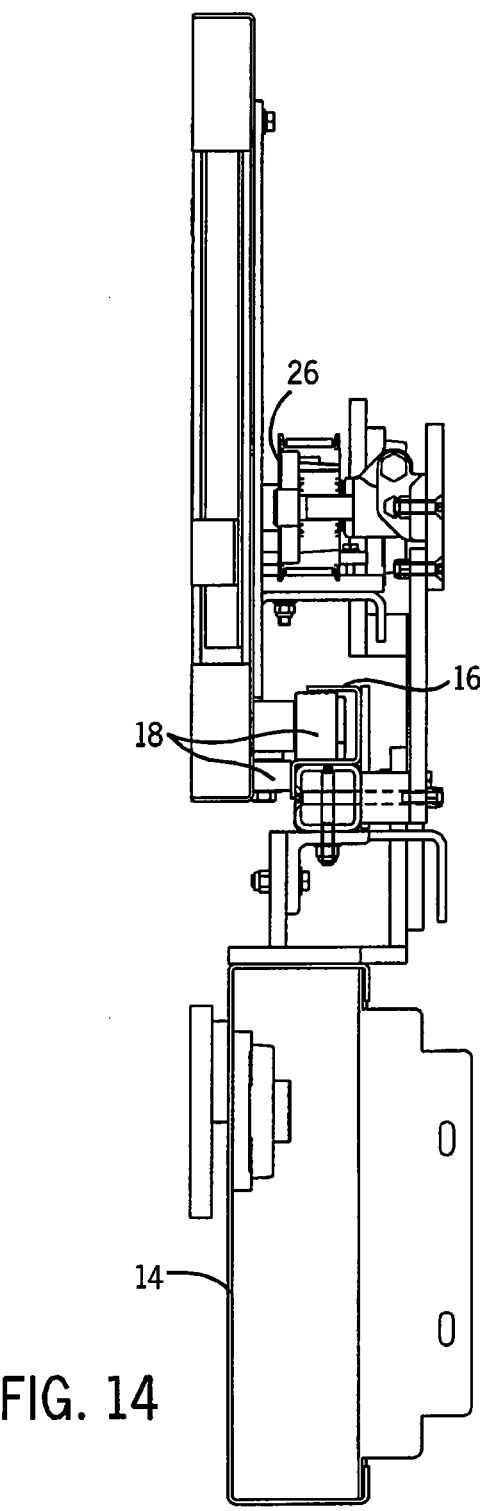
FIG. 14 is an enlarged view of the interconnection of the track and the pin matrix assembly of the depalletizer of FIG. 1 taken along line 14-14 of FIG. 3.
Figure 15:
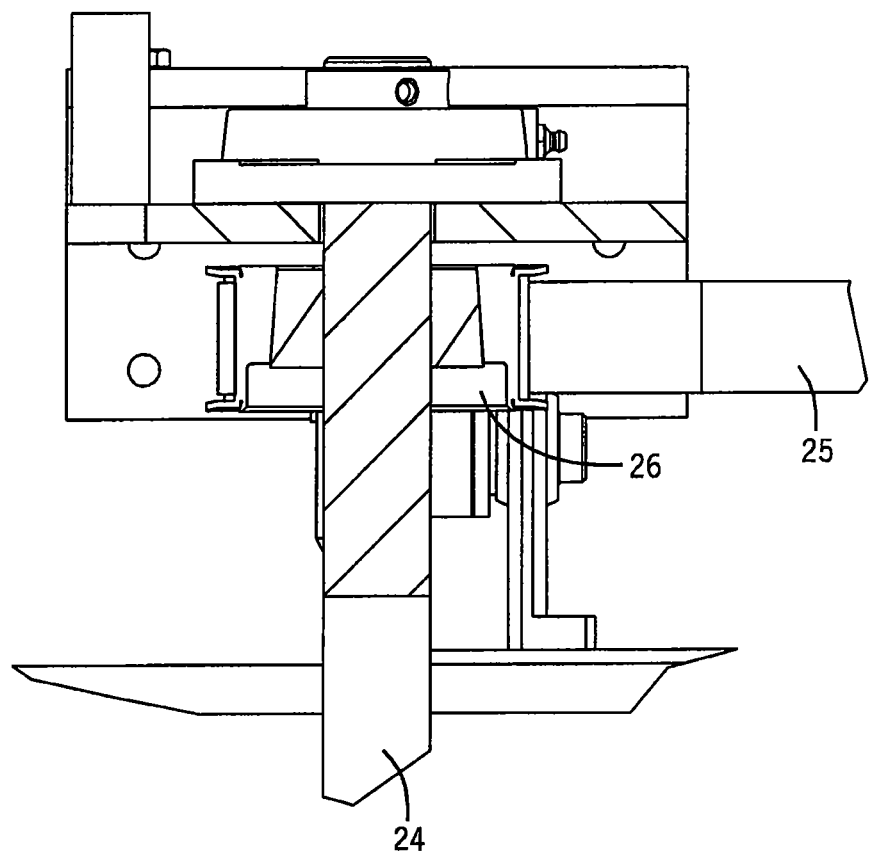
FIG. 15 is an enlarged view of a shaft, a pulley and a belt of the depalletizer of FIG. 1 taken along line 15-15 of FIG. 3.

The actuator 20 may be operably coupled with a drive assembly 23 for moving the pin matrix assembly 30 along the tracks 16. A portion of the drive assembly 23 is shown in FIG. 12. In the illustrated embodiment, the drive assembly 23 includes a shaft 24, belts 25 and pulleys 26 for moving the pin matrix assembly 30. See FIGS. 10 and 12-15. Specifically, the pin matrix assembly 30 is secured to each of the belts 25 by one or more clamps 27. Thus, the actuator 20 turns the shaft 24 which rotates the pulleys 26 and the belts 25, which in turn pulls the pin matrix assembly 30 along the tracks 16. When the actuator 20 rotates in a first direction, the pin matrix assembly 30 moves in a first direction along the tracks 16. Conversely, when the actuator 20 rotates in the opposite direction, the pin matrix assembly 30 moves in a second direction along the tracks opposite the first direction. It is also understood, however, that any other mechanism may be employed for moving the pin matrix assembly 30, e.g. a hydraulic cylinder assembly, linear actuators, etc.

Pin Matrix Assembly

Figure 17:
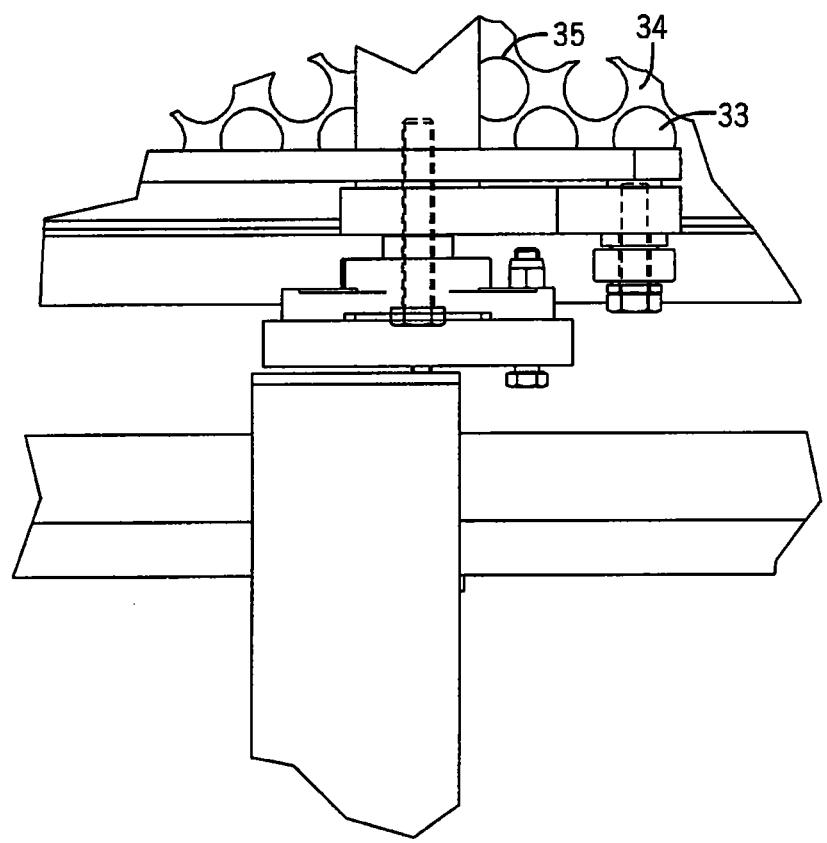
FIG. 17 is an enlarged view of the plate of the depalletizer of FIG. 1 taken along line 17-17 of FIG. 3.
Figure 18:
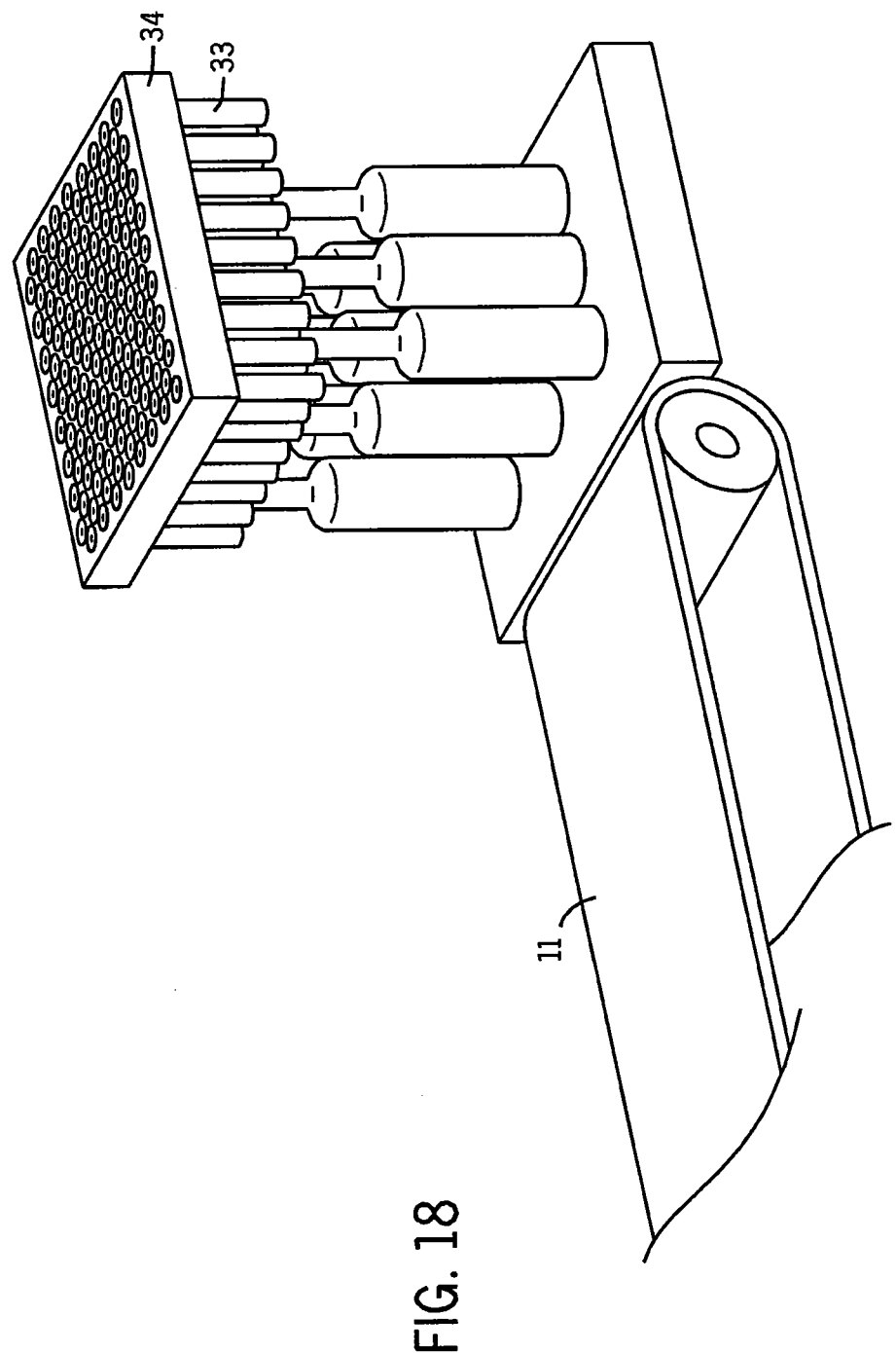
FIG. 18 is a schematic representation of the depalletizer of the present invention and shows the operation of the depalletizer when viewed in sequence with FIGS. 19-21.
Figure 19:
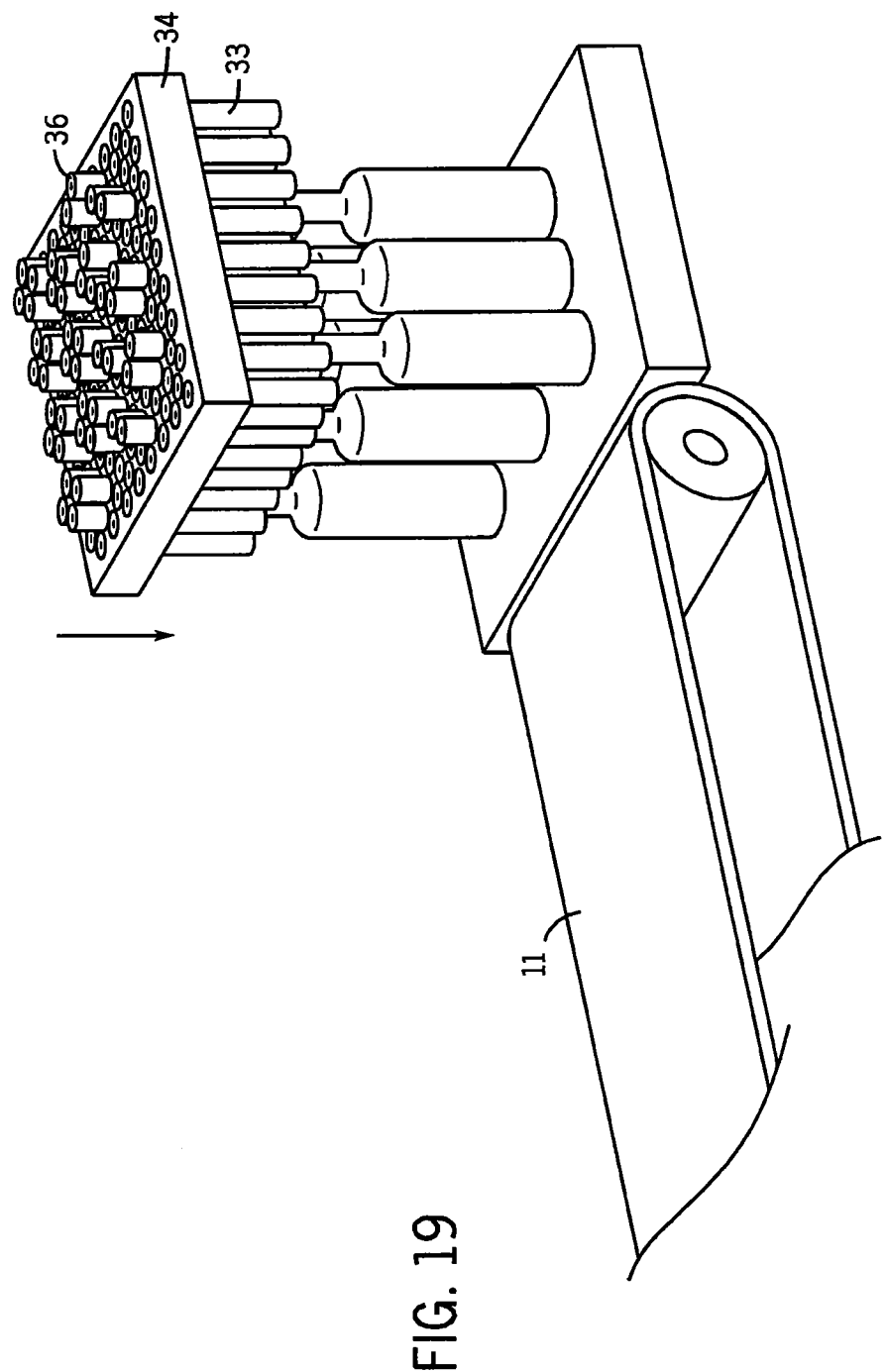
FIG. 19 illustrates lowering the pin matrix of the depalletizer of FIG. 18 over containers.
Figure 20:
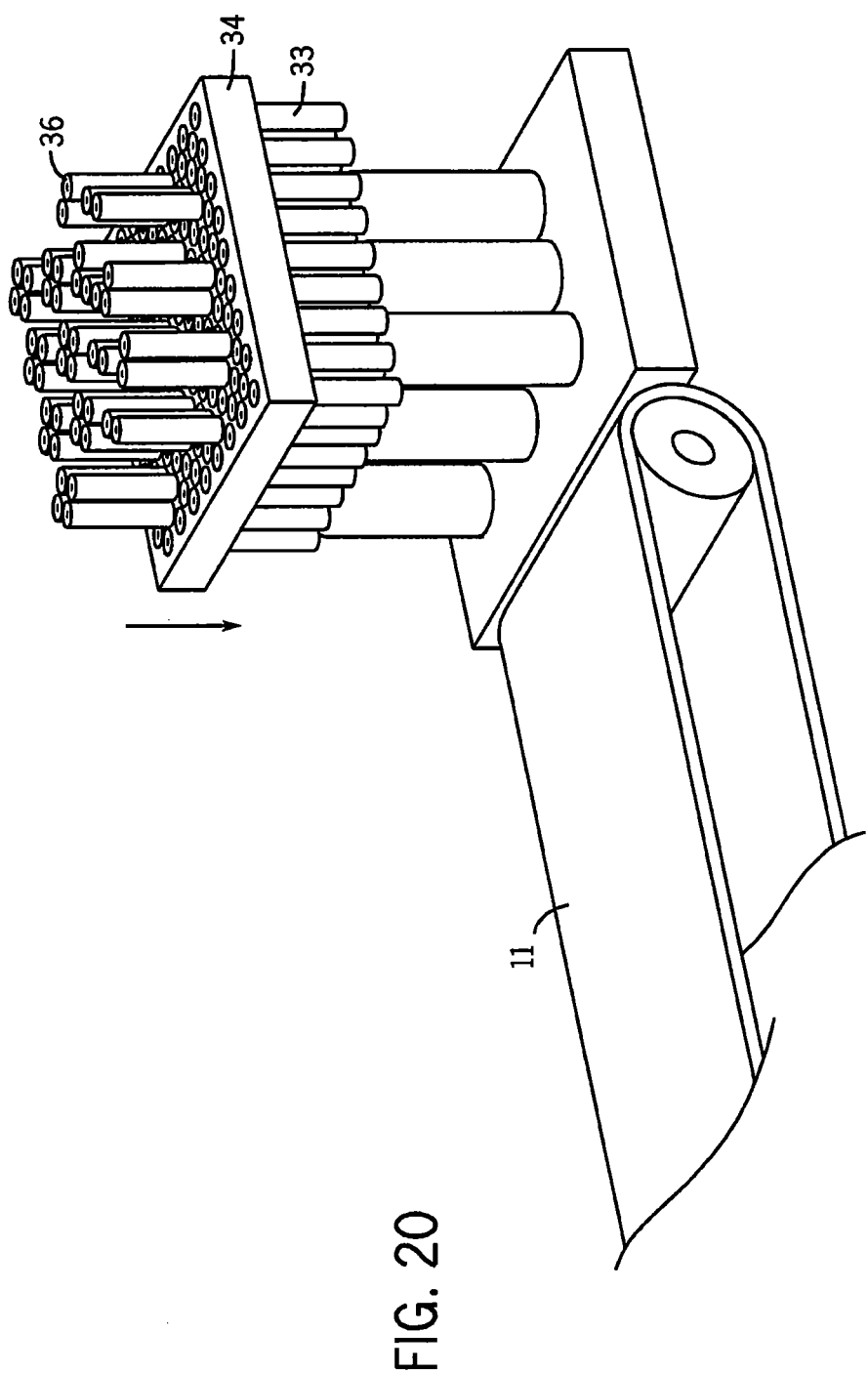
FIG. 20 illustrates securing the containers within the pin matrix of the depalletizer of FIG. 18.
Figure 21:
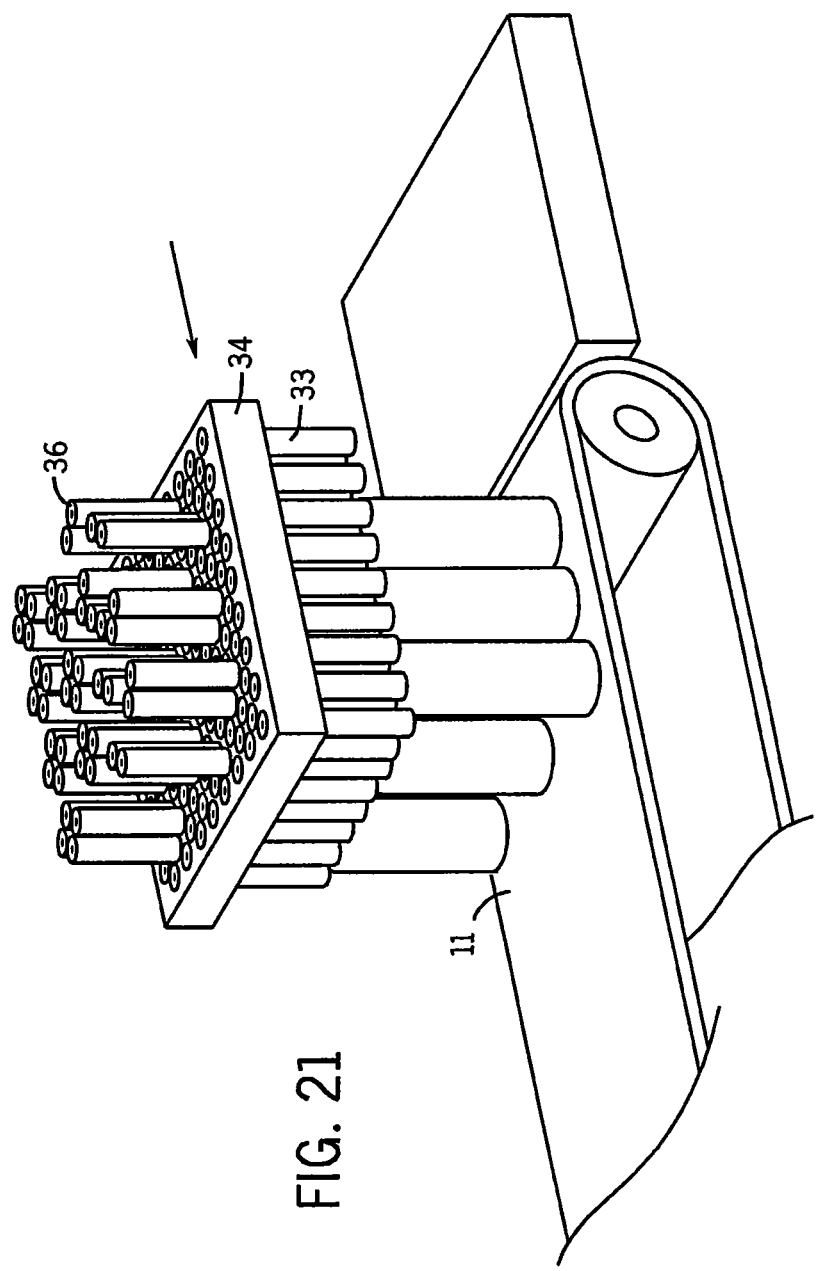
FIG. 21 illustrates moving or sweeping the containers on the conveyor belt.
Figure 22:
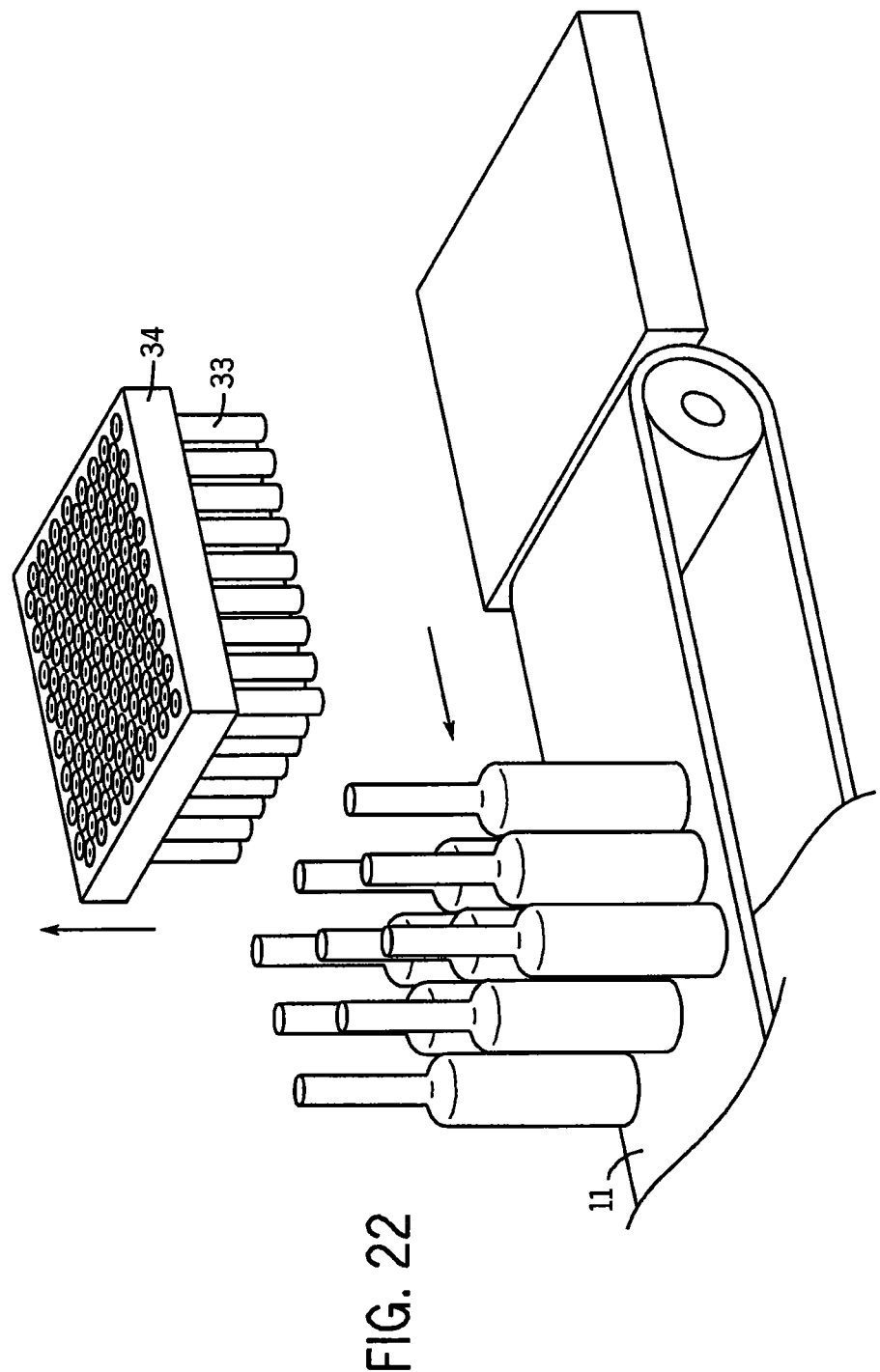
FIG. 22 illustrates lifting the pin matrix of the depalletizer of FIG. 18 upwardly out of engagement with the containers and movement of the containers on the conveyor belt.
Figure 23:
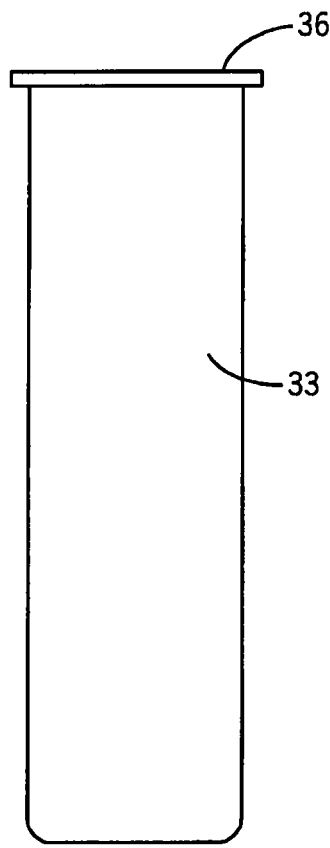
FIG. 23 illustrates a side elevation view of a pin used in conjunction with the depalletizer of the present invention.
Figure 24:
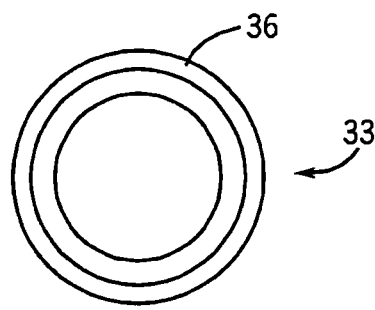
FIG. 24 illustrates a bottom plan view of the pin of FIG. 22.
Figure 25:
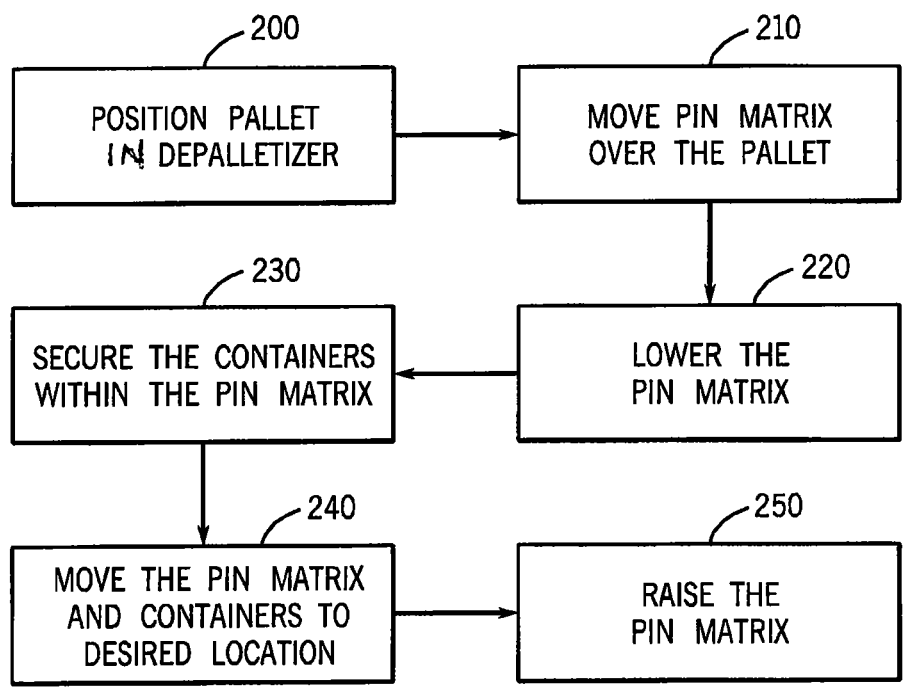
FIG. 25 is a flow chart of the method of unloading containers from a pallet of the present invention.

In the illustrated embodiment, the pin matrix assembly 30 includes the pin matrix 32 and a plate 34 that houses the pin matrix 32. The pin matrix 32 comprises a plurality of pins 33 that are preferably arranged in a particular manner. In the illustrated embodiment, the pins 33 are arranged into rows and columns as shown in FIGS. 1 and 2. Adjacent rows of pins 33 are offset from one another so as to eliminate extra space between pins 33. See, e.g., FIG. 17. It is understood, however, that the pins 33 may be arranged in any other pattern or configuration as desired in order to accommodate differently configured objects to be moved or swept by the pin matrix assembly 30.

The plate 34 has a plurality of apertures 35 that correspond with and house the pins 33 to form the pin matrix 32. The pin matrix 32 preferably has a footprint that is about the same size as the footprint of the pallet with which the depalletizer 10 is intended to be used. Thus, the pin matrix 32 will be able to secure and sweep all of the containers positioned on a given pallet. Moreover, there should be a sufficient number of pins 33 to secure the containers within the pin matrix 32. If there are too few pins 33, the containers may not be adequately secured and they may tip over when they are swept off of the pallet and onto the conveyor belt 11.

As shown in FIGS. 18-21, the plate 34 is positioned substantially horizontally so that the pins 33 hang below the plate 34 under the force of gravity. In the illustrated embodiment, the apertures 35 are slightly larger than the pins 33 so that the pins 33 are movable with respect to the apertures 35, i.e., the pins 33 can be raised upwardly with respect to the plate 34 when the pins 33 come into contact with a container as the plate 34 is lowered over the container.

In operation, the pin matrix 32 and the plate 34 are positioned over the containers on the pallet, e.g., by moving the pin matrix assembly 30 along the tracks 16. See FIG. 18. The pin matrix 32 and the plate 34 are then lowered over the containers. See FIG. 19. As certain pins 33 contact the containers, the containers push those pins 33 upwardly with respect to the plate 34. Other pins 33 fall between the containers, thus securing the containers within the pin matrix 32. See FIG. 20. In a bottle application, certain of the pins 33 are moved upwardly when they engage the top end of the bottle neck, and other pins 33 are moved upwardly when they engage the shoulder area of the bottle. Other pins 33 are not moved upwardly at all, and instead fall into the open areas between the bottles. Once the plate 34 has been lowered to a desirable level, e.g., one that is sufficient to secure the containers within the pin matrix 32, the pin matrix assembly 30 is moved along tracks 16 to slide the containers off of the pallet and onto the conveyor belt 11. See FIG. 21. Engagement of the pins 33 with and about the containers functions to draw the containers along with the pin matrix 32 as the pin matrix 32 is moved along the tracks 16. The pin matrix 32 and the plate 34 are then lifted upwardly above the containers, such that the pins 33 are moved upwardly out of contact with the containers.

The pins 33 may be in the form of rods or cylinders. The rounded edges of the pins 33 reduce the potential of damaging the containers, e.g., glass bottles. Additionally, the pins 33 preferably have a tapered end (at the end that contacts the containers) which helps to guide the pins between containers and also may prevent damage to the containers. The pins 33 are of a sufficient weight so as to be able to secure the containers with the pin matrix 32 and slide the containers off of the pallet.

In the illustrated embodiment, each pin 33 has a retainer area or head 36 that is located at the top of the pin 33. The size and shape of the retainer area 36 may vary so long as the retainer area 36 prevents the pin from falling through the corresponding aperture 35 in the plate 34. Where the pins 33 are cylinders, the retainer area 36 is preferably a circular disc having a diameter that is slightly larger than the diameter of both the pin 33 and the aperture 35. However, the diameter of the retainer area 36 should be of such size that it does not interfere with adjacent pins 33 or their retainer areas 36. The retainer area 36 may be attached to the pin 33 using any suitable means, e.g., screws, bolts, and adhesives. Alternatively, the retainer area 36 may be integral with the pin 33.

The pin matrix assembly 30 also includes support members 38 and side walls 39 that support the pin matrix 32 and the plate 34. As shown in FIG. 1, there are two-spaced apart support members 38 near the top of the pin matrix assembly 30 that are substantially parallel to one another. The pin matrix assembly 30 also has two spaced-apart side walls 39 that are generally parallel to one another. The support members 38 and the side walls 39 are substantially perpendicular to one another so as to form a substantially rectangular footprint for housing the pin matrix 32 and plate 34.

The side walls 39 are substantially vertical and provide a guide for the plate 34 as it is raised and lowered. For example, one or more of the side walls 39 may have a guide, e.g., a groove, which interfaces with the plate 34. It should be noted that alternative configurations with regard to support members may be used to support the pin matrix 32 and plate 34.

Figure 11:
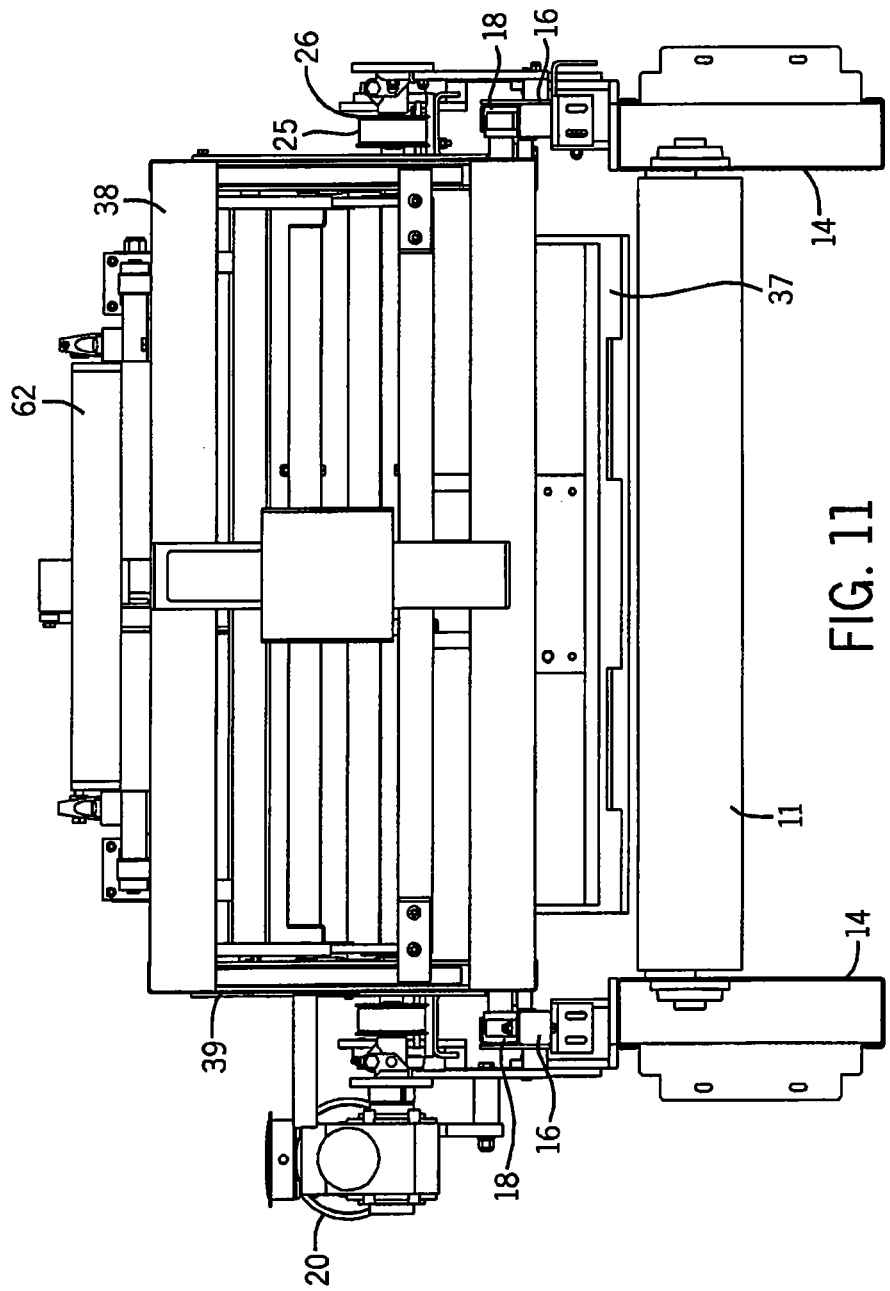
FIG. 11 is a rear elevation view of the depalletizer of FIG. 1.

It should further be noted that, if desired, the depalletizer 10 may be operated while the pin matrix 32 and plate 34 are in the raised position, i.e., so that the pins 33 do not contact or secure the containers for removal. Thus, where the pin matrix 32 is not needed to support or stabilize the containers, the depalletizer 10 is capable of removing containers in the traditional manner, i.e., by pushing them of the pallet and onto the conveyor belt using an arm 37 located near the back of the pin matrix assembly 30. See FIG. 11.

Lift Assembly

Figure 4:
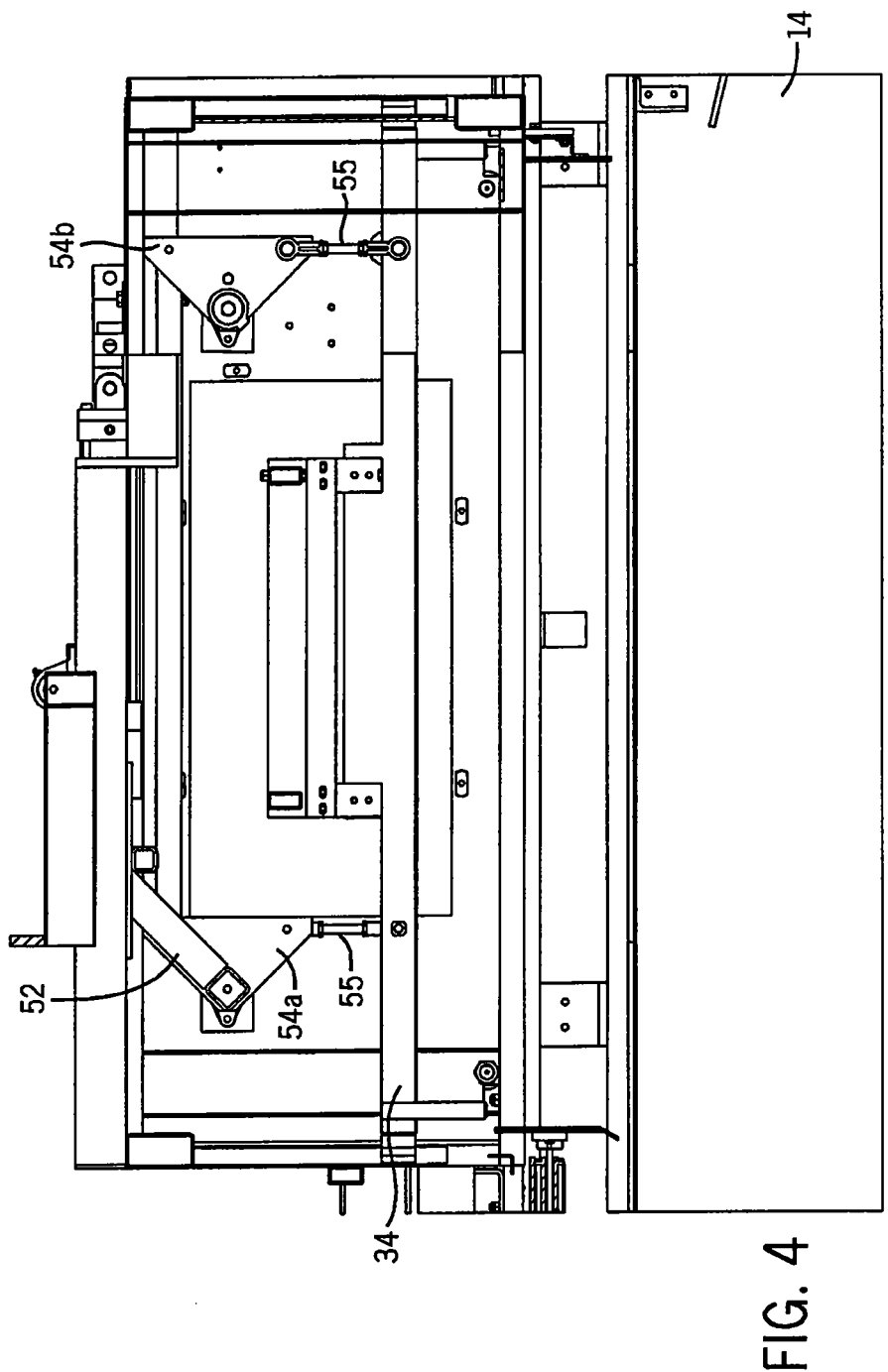
FIG. 4 illustrates a cross-section of the depalletizer of FIG. 1 taken along lines 4-4 as shown in FIG. 3.
Figure 5:
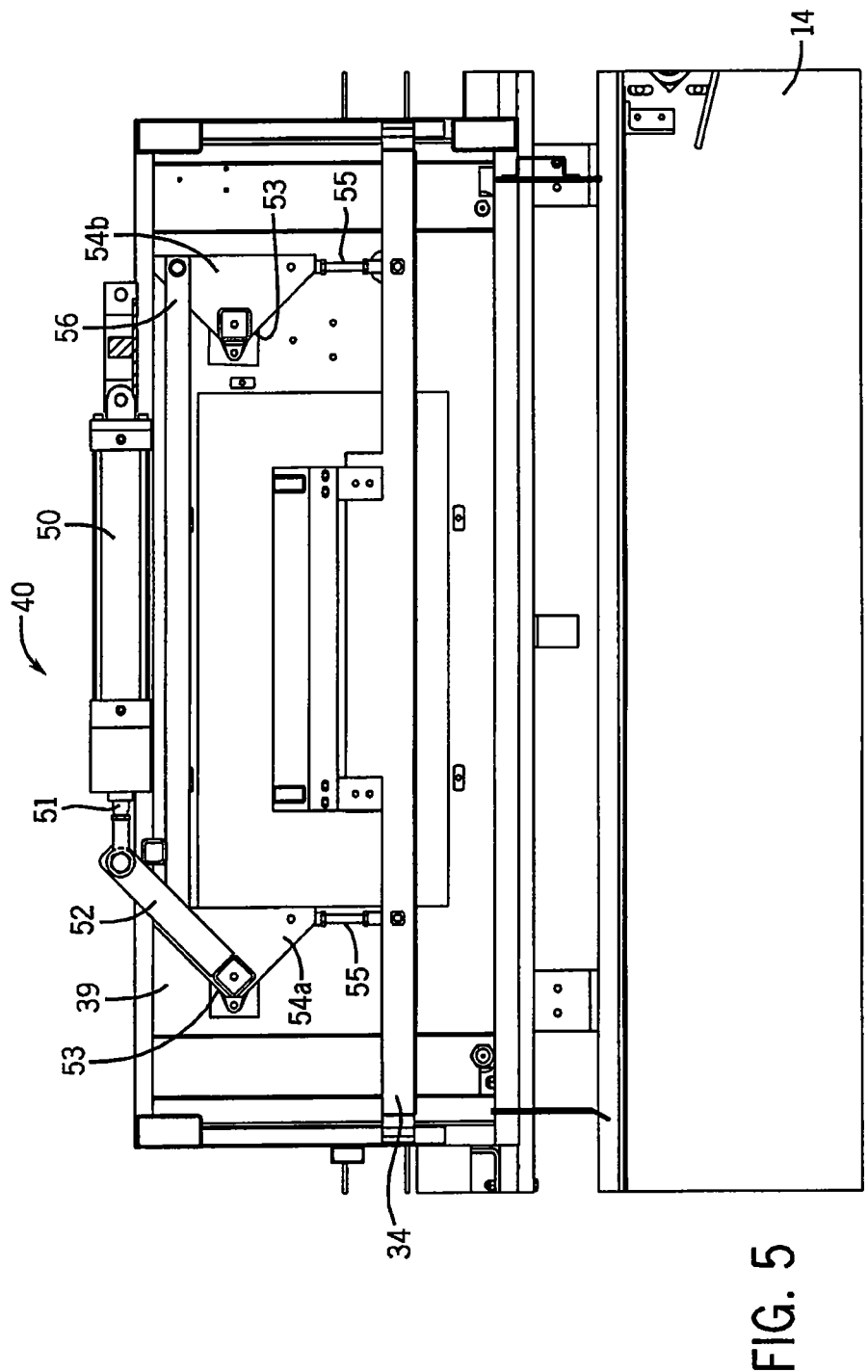
FIG. 5 illustrates a cross-section of the depalletizer of FIG. 1 taken along lines 5-5 as shown in FIG. 3.

The pin matrix assembly 30 further includes a lift assembly 40 for raising and lowering pin matrix 32 and the plate 34. See FIGS. 4 and 5. In the illustrated embodiment, the lift assembly 40 includes an actuator 50, an actuation member 52, and a bracket 54a. As shown in FIG. 5, the actuator 50 has a piston configuration that has a connecting rod 51 that is rotatably connected at one end to the actuation member 52. The actuation member 52 is fixedly connected to the bracket 54a, which is in turn rotatably connected to a side wall 39 of the pin matrix assembly 30.

As shown in FIG. 5, the bracket 54a is a triangle-shaped plate, and may be in the form of an isosceles triangle. In the illustrated embodiment (where the bracket 54a is an isosceles triangle), the longest side of the bracket 54a is substantially vertical when the pin matrix assembly 30 is in the lowered position. See FIG. 5. In the lowered position, the lowest corner of the bracket 54a is attached to the plate 34. Preferably, the bracket 54a is attached to the plate using a support rod 55 that is rotatably attached to the bracket 54a and the plate 34 at each respective end of the support rod 55.

The corner of the bracket 54a opposite the longest side of the bracket 54a is a pivot corner 53, i.e., the corner about which the bracket 54a rotates, and is rotatably attached to a side wall 39 on the outward facing side of the bracket 54a. On the inward facing side of the bracket 54a, the pivot corner 53 is fixedly connected to the actuation member 52.

In operation, when the pin matrix assembly 30 is in the lowered position, the connecting rod 51 extends outwardly from the actuator 50 to rotate the actuation member 52 and the bracket 54a in a counter-clockwise direction about the pivot corner 53. This in turn rotates the lowest corner (the corner attached to the plate 34) upwardly and raises the plate 34 and the pin matrix 32. Conversely, when the pin matrix assembly 30 is in the raised position, the connecting rod 51 is retracted back into the actuator 50 to rotate the actuation member 52 and the bracket 54a in a clockwise direction about the pivot corner 53 which lowers the plate 34 and the pin matrix 32.

In the illustrated embodiment, the actuator 50 is rotatably connected to the pin matrix assembly 30 at the end of the actuator 50 opposite the connecting rod 51. Such a configuration allows the actuator 50 to have a desired range of motion during operation, e.g., it can rotate as the pin matrix assembly 30 is raised and lowered. This in turn enables the plate 34 and pin matrix 32 to be linearly translated, e.g., vertically, as opposed to multi-directional translation, e.g., vertically and horizontally. It is desirable to eliminate horizontal movement of the pin matrix assembly 30 during the raising/lowering operation because such movement can cause the containers to tip over.

The lift assembly 40 may further include a second triangle-shaped bracket 54b located rearward of the first bracket 54a. The second bracket 54b is the same size and shape as the first bracket 54a, and it is similarly rotatably connected to the side wall 39 at a pivot corner 53. The second bracket 54b is connected to the plate 34 at the lowest corner (when the pin matrix assembly 30 is in the lowered position). As with the first bracket 54a, the second bracket 54b is preferably connected to the plate 34 by a support rod 55 that is rotatably connected to the second bracket 54b and plate 34 at each respective end.

The first bracket 54a and the second bracket 54b are preferably positioned in the same substantially vertical plane with the respective pivot corners 53 aligned along a substantially horizontal line within that plane. Moreover, the axis of rotation of the first bracket 54a and the axis of rotation of the second bracket 54b are substantially parallel to one another. The first bracket 54a and the second bracket 54b are connected to each other via a linkage 56 at their respective uppermost corners (when the pin matrix assembly 30 is in the lowered position). The linkage 56 is rotatably connected to the brackets 54a, 54b at each end. Thus, when the first bracket 54a is rotated by the actuator 50, the first bracket 54a rotates the second bracket 54b via the linkage 56 which in turn raises the plate 34 and pin matrix 32. This configuration provides further stability to the pin matrix assembly 30 during the raising/lowering operation.

Figure 3:
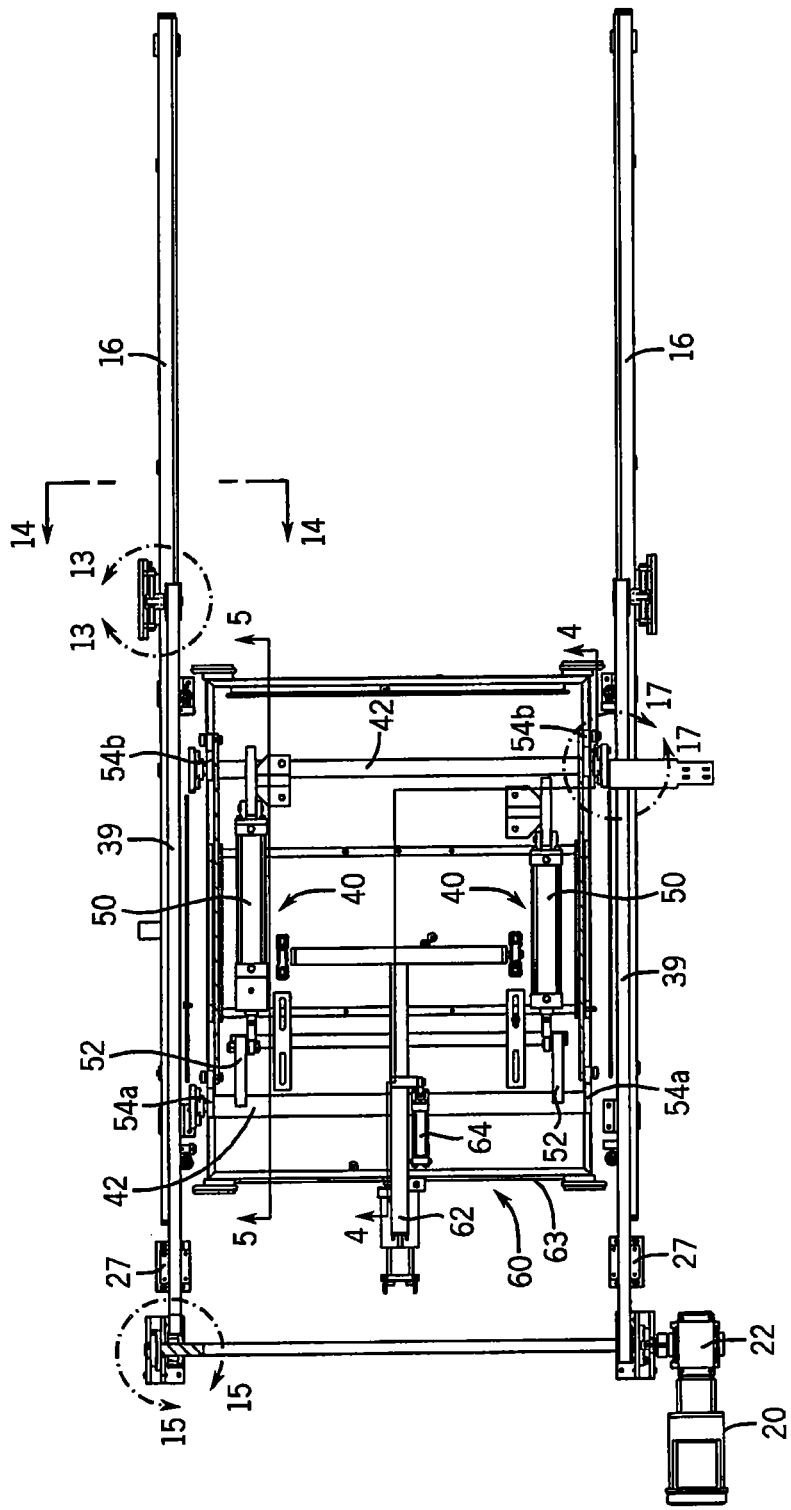
FIG. 3 illustrates a top plan view of the depalletizer of FIG. 1 (with certain components removed, e.g., the pallet removal assembly)
Figure 9:
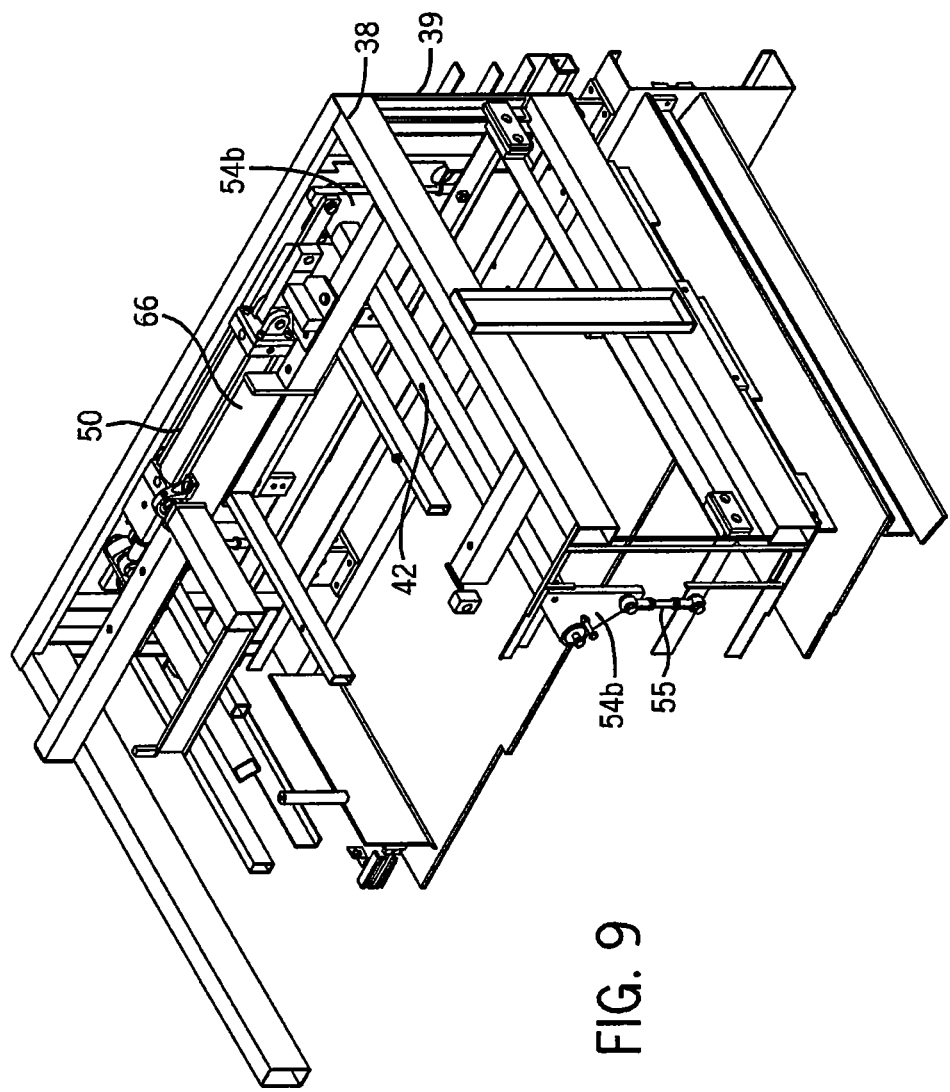
FIG. 9 is a partial isometric view of the pin matrix assembly of the depalletizer of FIG. 1.
Figure 10:
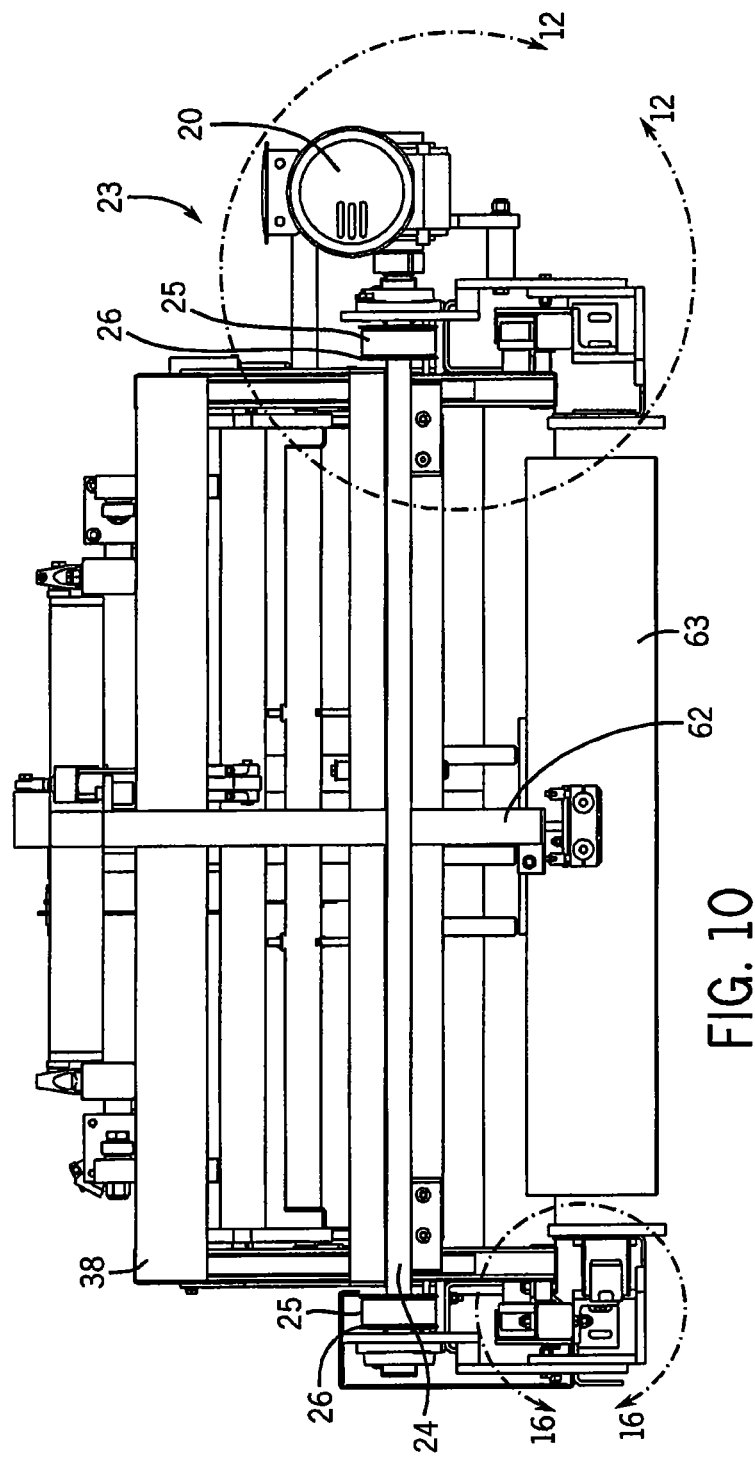
FIG. 10 is a front elevation view of the depalletizer of FIG. 1, showing the pin matrix in a lowered, operative position.

In the illustrated embodiment, the pin matrix assembly 30 has two lift assemblies 40 located on either side of the pin matrix assembly generally along each of the side walls 39. See, e.g., FIG. 3. The two lift assemblies 40 are connected to one another by one or more connecting rods 42. See FIG. 9. As shown in FIG. 3, each of the first brackets 54a is connected via a connecting rod 42 near the respective pivot corners 53 of the brackets 54a. Thus, each of the first brackets 54a share an axis of rotation that extends through the pivot corner 53 of each of the brackets 54a. Additionally, the connecting rod 42 in this configuration serves as the rigid connection between the actuation member 52 and the bracket 54a. Thus, for each lift assembly 40, the actuation member 52 moves the connecting rod 42 and causes the first bracket 54a to rotate about the pivot corner 53. During operation, the connecting rod 42 rotates about the axis of rotation that extends through the pivot corners 53 of the first brackets 54a.

The second brackets 54b of the respective lift assemblies 40 are similarly connected via a connecting rod 42 to further stabilize the pin matrix assembly and provide a smoother raising/lowering operation, e.g., by lifting the plate 34 near each of its four corners. As with the first brackets 54a, the second brackets 54b preferably share an axis of rotation that extends through the pivot corner 53 of each of the brackets 54b. Accordingly, the connecting rod 42 attached to the second brackets 54b rotates about the axis of rotation that extends through the pivot corners 53 of the second brackets 54b.

Arm Assembly

The pin matrix assembly 30 preferably also includes an arm assembly 60 located near the front of the depalletizer 10 that further secures and guides the containers as they are swept from the pallet. The arm assembly 60 includes an arm 62, an arm guide 63, an arm actuator 64 and arm supports 66. See, e.g., FIGS. 1, 3, 8 and 10.

The arm supports 66 are spaced apart and positioned substantially parallel to each other and to the side walls 39 of the pin matrix assembly 30. See FIG. 2. Each of the arm supports 66 is attached to the support members 38 (which are substantially perpendicular to the arm supports 66) at the top of the pin matrix assembly 30. As shown in FIG. 1, for each lift assembly 40, the actuator 50 is attached to a respective arm support 66.

The arm 62 is pivotally attached to each of the arm supports 66. Accordingly, the arm 62 can rotate upwardly thus raising the arm guide 63 (which is attached to one end of the arm 62). For example, after the containers have been removed from the pallet and positioned on the conveyor belt 11, the arm 62 and arm guide 63 are raised to allow the containers to move out from under the pin matrix assembly 30 and along the conveyor belt. Conversely, the arm 62 and arm guide 63 are lowered when the containers are still on the pallet to further secure the containers within the pin matrix assembly 30.

The arm actuator 64 is operably coupled with the arm 62 to raise and lower the arm 62 by pivoting the arm 62 about its connections with the arm supports 66. The actuator 64 may be any suitable device for moving the arm, but preferably the actuator 64 is a piston configuration wherein a connecting rod is extended and retracted from the actuator 64 in order to raise and lower the arm 62.

Pallet Removal Assembly

Figure 6:
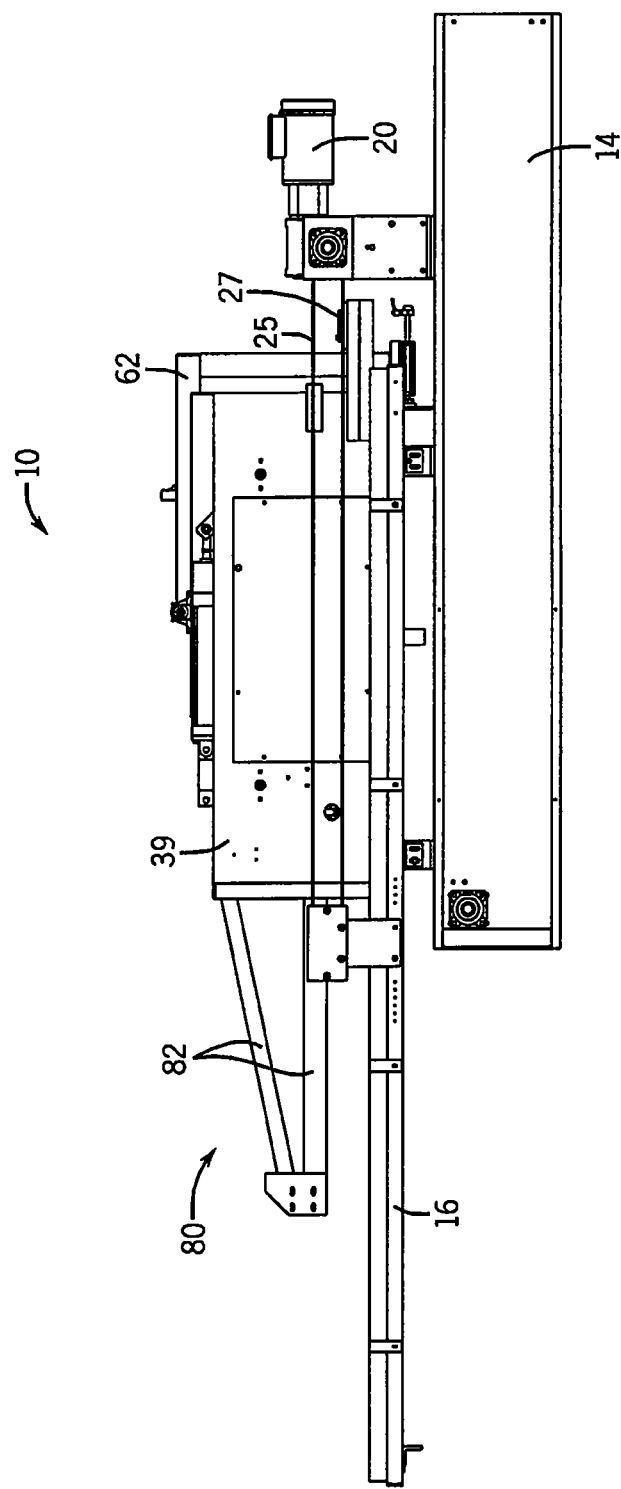
FIG. 6 is a side elevation view of the depalletizer of FIG. 1.
Figure 7:
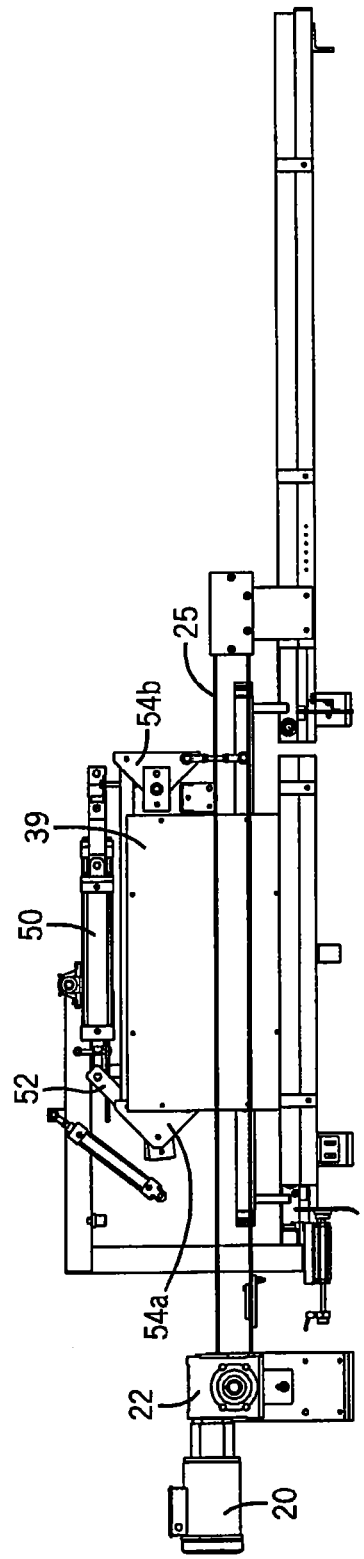
FIG. 7 is another side elevation view of the depalletizer of FIG. 1 (with certain components removed)
Figure 8:
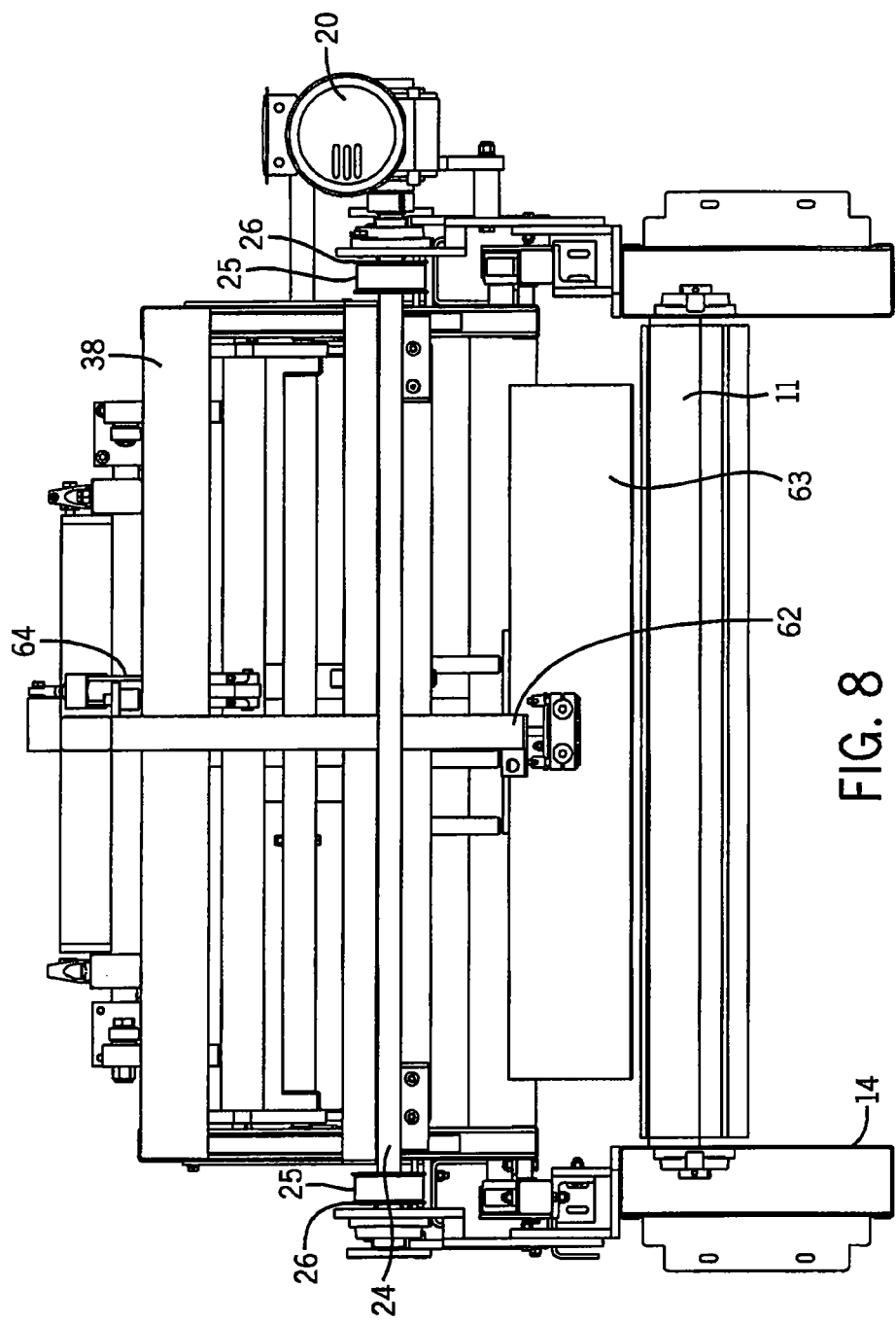
FIG. 8 is a front elevation view of the depalletizer of FIG. 1, showing the pin matrix in a raised, inoperative position.

The depalletizer 10 of the present invention further includes a pallet removal assembly 80 located near the rear of the depalletizer 10. See, e.g., FIGS. 1, 2 and 6. The pallet removal assembly 80 includes support members 82, an actuator 84 and a pallet removal structure 86.

The support members 82 are attached to and extend beyond the pin matrix assembly 30. In the illustrated embodiment, one of the support members 82 extends substantially horizontally from the bottom of the pin matrix assembly 30 and another support member 82 angles downwardly from the top of the pin matrix assembly 30.

As shown in FIG. 1, for each support member 82, one end is attached to the pin matrix assembly 30 while the other end is configured to house the actuator 82. In the illustrated embodiment, the actuator 84 is configured to linearly move the pallet removal structure 86 along a substantially vertical axis, i.e., to lift pallet upwardly.

As shown in FIGS. 1 and 2, the pallet removal structure 86 is formed by four side members 87 and is generally rectangular in shape. There is a cross-member 88 connecting two of the side members 87, and the cross-member 88 also passes through the center of the rectangular footprint of the pallet removal structure 86. The actuator 82 is operably connected to the cross-member 88 near the centers of the cross member 88 and the pallet removal structure 86. The pallet removal structure further includes gripping members 89, which releasably secure the pallet to the pallet removal structure 86. The gripping members 89 are positioned so that they generally align with the four corners of a rectangular-shaped pallet.

In operation, the pallet removal assembly 80 is positioned over an empty pallet. The pallet removal structure 86 is lowered by the actuator until the gripping members 89 have releasably secured the pallet to the pallet removal structure 86. The pallet removal structure 86 is then raised up to lift the pallet. The pin matrix assembly 30 is then moved along the tracks 16 to position the pallet over a disposal conveyor, where the pallet is placed on the disposal conveyor by lowering the pallet removal structure 86 and releasing the pallet from the gripping members 89.

It should be noted that there are many suitable configurations for the pallet removal assembly 80. For example, the pallet removal structure 86 does not need to be rectangular in shape. Rather, the pallet removal structure 86 may be any shape that provides suitable support for raising, lowering and moving pallets. In another example, there may be a single gripping member 89 as opposed to multiple gripping members 89.

Method of Removing Containers from Pallet

In another aspect of the present invention, a method for removing containers from a pallet with a pin matrix assembly (such as the one described in detail above) includes the following steps.

Step 200 comprises positioning a pallet to be emptied near the depalletizer. Preferably, the pallet is positioned between the tracks of the depalletizer and near the end of a conveyor belt for receiving and transporting containers from the pallet. The positioning step 200 may be performed using any suitable means, but preferably is performed using an elevator. More specifically, the depalletizer and conveyor belt for receiving the containers from the pallet preferably are raised off of the ground. Accordingly, the pallet with the containers is placed on the elevator and raised up to the depalletizer and conveyor belt.

Step 210 comprises positioning the depalletizer so that the pin matrix assembly is located above the pallet of containers. Step 210 may be accomplished by sliding the pin matrix assembly along the tracks of the depalletizer. Moving the pin matrix assembly may be accomplished by any suitable means, e.g., manually or using an actuator. The pin matrix assembly may representatively be positioned using an actuator that is operably coupled to a shaft, belts and pulleys.

Step 220 comprises lowering the pin matrix assembly until the containers are secured within the pin matrix. Step 230 comprises securing the containers within the pin matrix. Step 220 may be accomplished using any suitable means, e.g., manually or using an actuator. The pin matrix assembly may be lowered using an actuator coupled with a linkage assembly, e.g., an actuation member and a bracket.

Step 240 comprises moving the pin matrix assembly along a track (thus sliding the containers off of the pallet and onto the conveyor belt) and positioning the containers on the conveyor belt (or at another desired location). Step 250 comprises raising the pin matrix assembly and thus freeing the containers from the pin matrix. The method may further comprise the step of transporting the containers on the conveyor belt. Steps 210-250 may be repeated as necessary.

The method may also include the step of further securing the containers using an arm. Specifically, once the pin matrix has been lowered over the containers, the arm is lowered to further secure the containers. Alternatively, the arm could be lowered before the pin matrix is lowered. Once the containers have been swept off of the pallet and onto the conveyor belt, the arm is raised to allow the containers to move along the conveyor belt.

The method may further include the step of removing the emptied pallet. For example, the pallet may be removed using a pallet removal assembly that is attached to the depalletizer. Specifically, the pallet removal assembly (which may comprise an actuator, a pallet removal structure and grippers) is positioned over the empty pallet, e.g., by moving the pin matrix assembly along the tracks. The pallet removal structure is lowered and the grippers releasably grip the pallet. The pallet is raised up, moved, and lowered onto a conveyor belt that transports the emptied pallet away.

Although an exemplary mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

Moreover, the individual components need not be formed in the disclosed shapes, or assembled in the disclosed configuration, but could be provided in virtually any shape, and assembled in virtually any configuration. Further, although the depalletizer described herein is a physically separate module, it will be manifest that the may be integrated into the apparatus, e.g., a conveyor belt, with which it is associated. Furthermore, all the disclosed features of each disclosed embodiment can be combined with, or substituted for, the disclosed features of every other disclosed embodiment except where such features are mutually exclusive.

What is claimed is:

1. A device for moving a plurality of upright objects, comprising:
   a frame;
   a movable pin arrangement supported by the frame;
   a plurality of pins that form the pin arrangement;
   a plate having a plurality of apertures, each aperture corresponding with a respective one of the plurality of pins;
   a pair of tracks that straddle a conveyor belt and extend beyond an end of the conveyor belt, wherein the pin arrangement is movably supported by the tracks;
   a pair of laterally spaced support members;
   a pair of laterally spaced side supports, wherein the support embers and the side supports house the pin arrangement; and
   a lift assembly comprising:
      an actuator;
      a plurality of brackets supporting the plate, each bracket being rotatably attached to one of the side supports; and
      an actuation member operably coupled with the actuator and with at least one of the brackets;
      wherein the actuator moves along a path in a first direction so as to rotate at least one of the brackets and move the plate along a path in a second direction generally transverse to the first direction.

2. The device of claim 1, wherein the side supports and support members form a rectangular footprint that is about the size of a standard pallet.

3. The device of claim 1, wherein each bracket is a triangular plate and wherein, for each bracket, a first corner is rotatably attached to one of the side supports and a second corner supports the plate.

4. The device of claim 3, further comprising a plurality of support rods, wherein each support rod is connected at one end to the second corner of a respective bracket and at the other end to the plate so as to suspend the plate below the lift assembly.

5. The device of claim 1, wherein the actuator is one of a plurality of actuators and the actuation member is one of a plurality of actuation members, each actuation member being coupled to a respective bracket so that when the actuators are moved along the path in the first direction the brackets are rotated so as to move the plate along a the path in the second direction.

6. The device of claim 5, wherein the plurality of brackets is a first pair of brackets, and wherein the device further comprises a second pair of brackets that support the plate, the second pair of brackets being spaced apart from the first pair of brackets with each bracket of the second pair of brackets being rotatably supported by one of the side supports.

7. The device of claim 6, wherein the brackets comprising the first pair of brackets are connected to one another via a connecting rod that extends across at least a portion of the plate, and wherein the actuation members are connected to the connecting rod so as to rotate the first pair of brackets.

8. The device of claim 1, wherein the actuator is rotatably attached to the pin arrangement to allow for a range of motion as the actuator moves along the substantially horizontal path.

9. The device of claim 1, wherein the side supports are side walls.

10. The device of claim 1, wherein the first direction is generally horizontal and the second direction is generally vertical.

11. A device for moving a plurality of upright containers comprising:
   a frame having tracks that are spaced apart from one another and that straddle a conveyor;
   a pin arrangement movably supported by the tracks, the pin arrangement comprising a plate having a plurality of apertures and a plurality of pins received by the plurality of apertures;
   a lift assembly for raising and lowering the plate comprising two actuators, each actuator operably coupled with a respective one of a first pair of brackets, each bracket positioned proximate a respective opposing side of the plate, wherein the actuators move along a path in a first direction to rotate the brackets and move the plate along a path in a second direction transverse to the first direction;
   a second pair of brackets wherein each bracket is positioned proximate a respective opposing side of the plate and wherein the second pair of brackets is spaced apart from the first pair of brackets;
   a plurality of support rods that suspends the pin arrangement below the lift assembly, each support rod being operably connected to a respective bracket.

12. The device of claim 11, wherein the first pair of brackets has a first axis of rotation and wherein the second pair of brackets has a second axis of rotation, and wherein the first axis of rotation and the second axis of rotation are substantially parallel to one another.

13. The device of claim 11, wherein the first direction is generally horizontal and the second direction is generally vertical.

14. A method for moving objects relative to a surface, comprising the acts of:
   providing a pin arrangement supported by a bracket;
   moving the pin arrangement over the objects;
   actuating an actuator along a path in a first, axial direction to rotate the bracket in a first rotational direction and lower the pin arrangement along an upward-downward path generally transverse to the first direction;
   securing the containers within the pin arrangement;
   moving the pin arrangement and the objects relative to the surface; and
   raising the pin arrangement by actuating the actuator along the path in the first axial direction to rotate the bracket in a second rotational direction and raise the pin arrangement along the upward-downward path.

15. The method of claim 14, including the step of positioning the surface near the pin arrangement.

16. The method of claim 14, wherein the objects comprise a plurality of containers.

17. The method of claim 14, wherein the first axial direction is generally horizontal and the second upward-downward direction is generally vertical.

18. A device for moving a plurality of upright objects comprising:
   a pin arrangement comprising:

a plate having a plurality of apertures, and a plurality of pins, each pin being housed within a respective aperture and movable with respect to the plate;

a pair of support members on opposite sides of the plate;

a pair of spaced-apart brackets that supports the plate, the brackets being rotatably supported by a respective support member; and a pair of actuators that move along respective paths in a first direction to rotate the brackets and move the plate along a path in a second direction generally transverse to the first direction;

wherein the pair of brackets is connected via a connecting rod, and wherein the actuators are operably connected to the connecting rod so that when the actuators are moved along respective paths in the first direction, the pair of brackets is rotated and the plate is moved along the path in the second direction.

19. The device of claim 18, further comprising a track along which the pin arrangement translates, wherein the track extends beyond the end of a conveyor belt.

20. The device of claim 19, wherein the actuator is rotatably attached to the pin arrangement to allow for a range of motion as the actuator moves along the path in the first direction.

* * * * *

UNITED STATES PATENT AND TRADEMARK OFFICE
CERTIFICATE OF CORRECTION

| | | |
|---|---|---|
| PATENT NO. | : 8,622,686 B2 | |
| APPLICATION NO. | : 12/689601 | |
| DATED | : January 7, 2014 | |
| INVENTOR(S) | : Marvin L. Stringfield et al. | |

It is certified that error appears in the above-identified patent and that said Letters Patent is hereby corrected as shown below:

IN THE CLAIMS:

Claim 1, column 11, line 28, delete "embers" and substitute therefore -- members --;

Claim 5, column 11, line 58, delete "a".

Signed and Sealed this
Thirteenth Day of May, 2014

Michelle K. Lee
*Deputy Director of the United States Patent and Trademark Office*